US011613649B2

(12) United States Patent
Freeman et al.

(10) Patent No.: US 11,613,649 B2
(45) Date of Patent: Mar. 28, 2023

(54) THERMALLY-REARRANGED POLYMER BLENDS FOR GAS SEPARATION MEMBRANES

(71) Applicant: BOARD OF REGENTS, THE UNIVERSITY OF TEXAS SYSTEM, Austin, TX (US)

(72) Inventors: Benny D. Freeman, Austin, TX (US); Donald R. Paul, Austin, TX (US); Joshua D. Moon, Austin, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 0 days.

(21) Appl. No.: 17/044,540

(22) PCT Filed: Apr. 2, 2019

(86) PCT No.: PCT/US2019/025393
§ 371 (c)(1),
(2) Date: Oct. 1, 2020

(87) PCT Pub. No.: WO2019/195296
PCT Pub. Date: Oct. 10, 2019

(65) Prior Publication Data
US 2021/0095122 A1 Apr. 1, 2021

Related U.S. Application Data

(60) Provisional application No. 62/651,337, filed on Apr. 2, 2018.

(51) Int. Cl.
*C08L 79/08* (2006.01)
*B01D 53/22* (2006.01)
(Continued)

(52) U.S. Cl.
CPC ............ *C08L 79/08* (2013.01); *B01D 53/228* (2013.01); *B01D 53/268* (2013.01);
(Continued)

(58) Field of Classification Search
None
See application file for complete search history.

(56) References Cited

U.S. PATENT DOCUMENTS

| 4,973,629 A | 11/1990 | Williams et al. |
| 7,950,529 B2 | 5/2011 | Kulkarni et al. |

(Continued)

FOREIGN PATENT DOCUMENTS

WO 2012/167114 A2 12/2012

OTHER PUBLICATIONS

Panapitiya, Nimanka et al., "Compatibilized Immiscible Polymer Blends for Gas Separations", Materials, 2016, 9, 643, 23 pages. (Year: 2016).*

(Continued)

*Primary Examiner* — Jason M Greene
(74) *Attorney, Agent, or Firm* — Meunier Carlin & Curfman LLC

(57) ABSTRACT

Polymer blends comprising an ortho-functionalized polyimide homo or copolymer and a polybenzimidazole homo or copolymer, wherein the ortho-functionalized polyimide thermally rearranges to a polymer comprising a phenylene heterocyclic group, such as, polybenzoxazole, polybenzothiazole, polybenzimidazole and/or other heterocyclic structure upon heating. Also disclosed are method of forming a polymer blend comprising dissolving an ortho-functionalized polyimide homo or copolymer and a polybenzimidazole homo or copolymer in a solvent, and optional compatibilizer, to form a polymer solution; contacting a support with the polymer solution; and evaporating the solvent to provide (Continued)

Figure 1A:
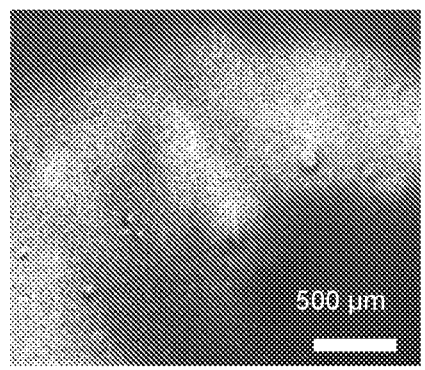

a thin layer comprising the polymer blend on the support. Further, methods of heat treating these polymer blends to thermally rearrange the disclosed polyimides are disclosed, as are the polymer blends prepared thereby. Methods of using these polymer blends to separate gases are also disclosed.

24 Claims, 17 Drawing Sheets

(51) Int. Cl.
B01D 53/26 (2006.01)
B01D 67/00 (2006.01)
B01D 69/12 (2006.01)
B01D 71/64 (2006.01)

(52) U.S. Cl.
CPC ..... *B01D 67/0013* (2013.01); *B01D 67/0018* (2013.01); *B01D 69/12* (2013.01); *B01D 71/64* (2013.01); *C08L 2207/02* (2013.01)

(56) References Cited

U.S. PATENT DOCUMENTS

| | | | |
|---|---|---|---|
| 8,561,812 B2 | 10/2013 | Liu et al. | |
| 10,046,284 B2 | 8/2018 | Ferraris et al. | |
| 2010/0078386 A1* | 4/2010 | Kulkarni | B01D 53/228 210/650 |
| 2012/0329958 A1* | 12/2012 | Freeman | C08G 73/1039 525/425 |
| 2016/0263534 A1* | 9/2016 | Ferraris | B01D 53/228 |
| 2017/0166699 A1 | 6/2017 | Tena et al. | |

OTHER PUBLICATIONS

International Search Report and Written Opinion dated Jul. 9, 2019, from International Application No. PCT/US2019/025393, 9 pages.
Panapitiya, N. et al. "Compatibilized Immiscible Polymer Blends for Gas Separations", Materials 2016, 9, 643, 23 pages.
Ahn, et al., Hydrogen-Bonding Strength in the Blends of Polybenzimidazole with BTDA- and DSDA-Based Polyimides. Macromolecules 1997, 30, 3369-3374.
Aili et al., Thermal curing of PBI membranes for high temperature PEM fuel cells. Journal of Materials Chemistry, 2012, 22, 5444-5453.
Berchtold, et al., High temperature polymer-based membrane systems for pre-combustion carbon dioxide capture. 2012, 37 pages.
Berchtold, K. A.; Singh, R. P.; Young, J. S.; Dudeck, K. W., Polybenzimidazole composite membranes for high temperature synthesis gas separations. Journal of Membrane Science 2012, 415-416, 265-270.
Borjigin, H.; Stevens, K. A.; Liu, R.; Moon, J. D.; Shaver, A. T.; Swinnea, S.; Freeman, B. D.; Riffle, J. S.; McGrath, J. E., Synthesis and characterization of polybenzimidazoles derived from tetraaminodiphenylsulfone for high temperature gas separation membranes. Polymer 2015, 71, 135-142.
Calle, M.; Doherty, C. M.; Hill, A. J.; Lee, Y. M., Cross-Linked Thermally Rearranged Poly(benzoxazole-co-imide) Membranes for Gas Separation. Macromolecules 2013, 46, 8179-8189.
Campbell, G. C.; VanderHart, D. L., Optimization of chemical-shift-based polarization gradients in 1H NMR spin-diffusion experiments on polymer blends with chemically similar constituents. Journal of Magnetic Resonance (1969) 1992, 96, 69-93.
Chamaal, K. et al., Thermally treated compatibilized immiscible polymer blends for high temperature, high pressure H2 separation. Abstracts of Papers, 254th ACS National Meeting & Exposition, Washington, DC, Aug. 20-24, 2017, PMSE-578.
Choi, J. I.; Jung, C. H.; Han, S. H.; Park, H. B.; Lee, Y. M., Thermally rearranged (TR) poly(benzoxazole-co-pyrrolone) membranes tuned for high gas permeability and selectivity. Journal of Membrane Science 2010, 349, 358-368.
Chung, A Critical Review of Polybenzimidazoles. J Macromol Sci, Part C 1997, 37, 277-301.
Chung, T. S.; Herold, F. K., High-modulus polyaramide and polybenzimidazole blend fibers. Polymer Engineering & Science 1991, 31, 1520-1526.
Chung, T.-S., The effect of lithium chloride on polybenzimidazole and polysulfone blend fibers. Polymer Engineering & Science 1994, 34, 428-433.
Chung, T.-S.; Glick, M.; Powers, E. J., Polybenzimidazole and polysulfone blends. Polymer Engineering & Science 1993, 33, 1042-1048.
Figueroa, J. D.; Fout, T.; Plasynski, S.; Mcflvried, H.; Srivastava, R. D. Advances in CO2 capture technology—The U.S. Department of Energy's Carbon Sequestration Program Int. J. Greenh. Gas Control, 2008. 2: p. 9-20.
Földes, E.; Fekete, E.; Karasz, F. E.; Pukánszky, B., Interaction, miscibility and phase inversion in PBI/PI blends. Polymer 2000, 41, 975-983.
Grobelny, J.; Rice, D. M.; Karasz, F. E.; MacKnight, W. J., High-Resolution Solid-State Carbon-13 Nuclear Magnetic Resonance Study of Polybenzimidazole/Polyimide Blends. Macromolecules 1990, 23, 2139-2144.
Guerra, G.; Choe, S.; Williams, D. J.; Karasz, F. E.; MacKnight, W. J., Fourier Transform Infrared Spectroscopy of Some Miscible Polybenzimidazole/Polyimide Blends. Macromolecules 1988, 21, 231-234.
Guerra, G.; Williams, D. J.; Karasz, F. E.; MacKnight, W. J., Miscible polybenzimidazole blends with a benzophenone-based polyimide. Journal of Polymer Science Part B: Polymer Physics 1988, 26, 301-313.
Han, et al., Highly Gas Permeable and Microporous Polybenzimidazole Membrane by Thermal Rearrangement. Journal of Membrane Science 2010, 357, 143-151.
Hindman, et al., Synthesis of 1,2-Dialkyl-, 1,4(5)-Dialkyl-, and 1,2,4(5)-Trialkylimidazoles via a One-Pot Method. Industrial & Engineering Chemistry Research 2013, 52, 11880-11887.
Hosseini, S.S.; Teoh, M.M.; Chung, T.S. Hydrogen separation and purification in membranes of miscible polymer blends with interpenetration networks. Polymer, 2008. 49(6): p. 1594-1603.
Huang, Y. Immiscible polymer blend membranes for high pressure, high temperature H2/CO2 separation. Dissertation, The University of Texas at Dallas, 2016.
Iwakura, et al., Polybenzimidazoles. II. Polyalkylenebenzimidazoles. Die Makromolekulare Chemie 1964, 77, 33-40.
Jaffe, M.; Chen, P.; Choe, E.-W.; Chung, T.-S.; Makhija, S., High performance polymer blends. In High Performance Polymers, Springer, Berlin, Heidelberg: 1994; pp. 297-327.
Jung, C. H.; Lee, J. E.; Han, S. H.; Park, H. B.; Lee, Y. M., Highly permeable and selective poly(benzoxazole-co-imide) membranes for gas separation. Journal of Membrane Science 2010, 350, 301-309.
Koning, et al., Strategies for Compatibilization of Polymer Blends. Progress in Polymer Science 1998, 23, 707-757.
Kumbharkar, et al., Investigation of gas permeation properties of systematically modified polybenzimidazoles by N-substitution. J Membr Sci 2010, 357, 134-142.
Kumbharkar, et al., Enhancement of Gas Permeation Properties of Polybenzimidazoles by Systematic Structure Architecture. J Membr Sci 2006, 286, 161-169.
Kumbharkar, et al., High performance polybenzimidazole based asymmetric hollow fibre membranes for H2/CO2 separation. J Membr Sci 2011, 375, 231-240.
Kumbharkar, et al., New N-substituted ABPBI: Synthesis and evaluation of gas permeation properties. J Membr Sci 2010, 360, 418-425.
Leung, L.; Williams, D. J.; Karasz, F. E.; MacKnight, W. J., Miscible blends of aromatic polybenzimidazoles and aromatic polyimides. Polymer Bulletin 1986, 16, 457-464.
Leykin, et al., Some Aspects of Polybenzimidazoles' Synthesis in P2O5 Containing Condensation Media. Polymer 2010, 51, 4053-4057.

(56) References Cited

OTHER PUBLICATIONS

Li, et al, Influence of polybenzimidazole main chain structure on H2/CO2 separation at elevated temperatures. J Membr Sci 2014, 461, 59-68.

Li, et al., Synthesis and Characterization of a New Fluorine-Containing Polybenzimidazole (PBI) for Proton-Conducting Membranes in Fuel Cells. Fuel Cells 2013, 13, 832-842.

Lin, H.; Freeman, B. D., Permeation and Diffusion. In Springer Handbook of Material Measurement Methods, Czichos, H.; Smith, L. E.; Saito, T., Eds. Springer: New York, 2006; pp. 371-387.

Luo, S.; Zhang, Q.; Bear, T. K.; Curtis, T. E.; Roeder, R. K.; Doherty, C. M.; Hill, A. J.; Guo, R., Triptycene-containing Poly(benzoxazole-co-imide) Membranes with Enhanced Mechanical Strength for High-Performance Gas Separation. Journal of Membrane Science 2018, 551, 305-314.

Maity, et al., Soluble Polybenzimidazoles for PEM: Synthesized from Efficient, Inexpensive, Readily Accessible Alternative Tetraamine Monomer. Macromolecules 2013, 46, 6814-6823.

Makhija, S.; Pearce, E. M.; Kwei, T. K.; Liu, F., Miscibility studies in blends of polybenzimidazoles and poly(4-vinyl pyridine). Polymer Engineering & Science 1990, 30, 798-801.

Merkel, T. C.; Zhou, M.; Baker, R. W., Carbon dioxide capture with membranes at an IGCC power plant. Journal of Membrane Science 2012, 389, 441-450.

Moon et al. Water vapor sorption, diffusion, and dilation in polybenzimidazoles. Macromolecules, 2018, 51, 7197-7208.

Musto et al. Infrared spectroscopy of polybenzimidazole in the dry and hydrate forms: a combined experimental and computational study. ACS Omega, 2018, 3, 11592-11607.

Musto, P.; Karasz, F. E.; MacKnight, W. J., Hydrogen bonding in polybenzimidazole/polyimide systems: a Fourier-transform infrared investigation using low-molecular-weight monofunctional probes. Polymer 1989, 30, 1012-1021.

Olabisi, O., Handbook of Thermoplastics. Marcel Dekker: New York, 1996, 47 pages.

Panapitiya, N. P. Novel compatibilized immiscible polymer blend based membranes for gas separations. Dissertation, The University of Texas at Dallas, 2014.

Panapitiya, N. P.; Wijenayake, S. N.; Huang, Y.; Bushdiecker, D.; Nguyen, D.; Ratanawanate, C.; Kalaw, G. J.; Gilpin, C. J.; Musselman, I. H.; Balkus, K. J.; Ferraris, J. P., Stabilization of immiscible polymer blends using structure directing metal organic frameworks (MOFs). Polymer 2014, 55, 2028-2034.

Panapitiya, N. P.; Wijenayake, S. N.; Nguyen, D. D.; Huang, Y.; Musselman, I. H.; Balkus, K. J.; Ferraris, J. P., Gas Separation Membranes Derived from High-Performance Immiscible Polymer Blends Compatibilized with Small Molecules. ACS Applied Materials & Interfaces 2015, 7, 18618-18627.

Panapitiya, N. P.; Wijenayake, S. N.; Nguyen, D.; Karunaweera, C.; Huang, Y.; Balkus Jr., K.; Musselman, I.; Ferraris, J., Compatibilized Immiscible Polymer Blends for Gas Separations. Materials 2016, 9, 643.

Park, H. B.; Jung, C. H.; Lee, Y. M.; Hill, A. J.; Pas, S. J.; Mudie, S. T.; Wagner, E. V.; Freeman, B. D.; Cookson, D. J., Polymers with Cavities Tuned for Fast Selective Transport of Small Molecules and Ions. Science 2007, 318, 254-258.

Perez et al. Improvement of gas separation properties of polybenzimidazole membranes for gas separations at high pressure and high temperature through thermal treatment. Prepr. Pap.-Am. Chem. Soc., Div. Energy Fuels, 2016, 61, 208.

Pesiri, et al., Thermal optimization of polybenzimidazole meniscus membranes for the separation of hydrogen, methane, and carbon dioxide. J Membr Sci 2003, 218, 11-18.

Petropoulos, J. H. A comparative study of approaches applied to the permeability of binary composite polymeric materials. Journal of Polymer Science: Polymer Physics Edition, 1985, 23, 1309-1324.

Qian, et al., Synthesis and Characterization of High Molecular Weight Perfluorocyclobutyl-Containing Polybenzimidazoles (PFCB-PBI) for High Temperature Polymer El 5 ectrolyte Membrane Fuel Cells. Polymer 2009, 50, 3911-3916.

Qian, et al., Synthesis and Characterization of High Molecular Weight Hexafluoroisopropylidene-Containing Polybenzimidazole for High-Temperature Polymer Electrolyte Membrane Fuel Cells. Journal of Polymer Science Part A: Polymer Chemistry 2009, 47, 4064-4073.

Robeson, L. M., Polymer Blends in Membrane Transport Processes. Industrial & Engineering Chemistry Research 2010, 49, 11859-11865.

Robeson, L. M., The upper bound revisited. Journal of Membrane Science 2008, 320, 390-400.

Sanders, D. F.; Guo, R.; Smith, Z. P.; Liu, Q.; Stevens, K. A.; McGrath, J. E.; Paul, D. R.; Freeman, B. D., Influence of polyimide precursor synthesis route and ortho-position functional group on thermally rearranged (TR) polymer properties Conversion and free volume. Polymer 2014, 55, 1636-1647.

Sanders, D. F.; Smith, Z. P.; Ribeiro Jr., C. P.; Guo, R.; McGrath, J. E.; Paul, D. R. Freeman, B. D., Gas permeability, diffusivity, and free volume of thermally rearranged polymers based on 3,3'-dihydroxy-4,4'-diamino-biphenyl (HAB) and 2,2'-bis-(3,4-dicarboxyphenyl) hexafluoropropane dianhydride (6FDA). Journal of Membrane Science 2012, 409-410, 232-241.

Sanders, et al., Energy-efficient polymeric gas separation membranes for a sustainable future: A review. Polymer 2013, 54, 4729-4761.

Scholes, C. A.; Ribeiro, C. P.; Kentish, S. E.; Freeman, B. D., Thermal rearranged poly(benzoxazole)/polyimide blended membranes for CO2 separation. Separation and Purification Technology 2014, 124, 134-140.

Sejin, K. Effect of small molecules on membrane microstructure and gas separation properties. Master's thesis, The University of Texas at Dallas, 2016.

Shamsipur, et al., Thermally Rearrangeable PIM-Polyimides for Gas Separation Membranes. Macromolecules 2014, 47, 5595-5606.

Shi, G. M.; Chen, H.; Jean, Y. C.; Chung, T. S., Sorption, swelling, and free volume of polybenzimidazole (PBI) and PBI/zeolitic imidazolate framework (ZIH-8) nano-composite membranes for pervaporation. Polymer 2013, 54, 774-783.

Singh, R. P.; Li, X.; Dudeck, K. W.; Benicewicz, B. C.; Berchtold, K. A., Polybenzimidazole based random copolymers containing hexafluoroisopropylidene functional groups for gas separations at elevated temperatures. Polymer 2017, 119, 134-141.

Smith, Z. P.; Hernández, G.; Gleason, K. L.; Anand, A.; Doherty, C. M.; Konstas, K.; Alvarez, C.; Hill, A. J.; Lozano, A. E.; Paul, D. R.; Freeman, B. D., Effect of polymer structure on gas transport properties of selected aromatic polyimides, polyamides and TR polymers. Journal of Membrane Science 2015, 493, 766-781.

Smith, Z.P.; Sanders, D.F.; Ribeiro, C.P.; Guo, R.; Freeman, B.D.; Paul, D.R.; McGrath, J.E.; Swinnea,S. Gas sorption and characterization of thermally rearranged polyimides based on 3,3'-dihydroxy-4,4'-diamino-biphenyl (HAB) and 2,2'-bis-(3,4-dicarboxyphenyl) hexafluoropropane dianhydride (6FDA). Journal of Membrane Science, 2012. 415-416: p. 558-567.

Stankovic, S.; Guerra, G.; Williams, D. J.; Karasz, F. E.; MacKnight, W. J., Miscible blends of polybenzimidazole and a diisocyanate-based polyimide. Polymer Communications 1988, 29, 14-16.

Ueda, et al., Poly(Benzimidazole) Synthesis by Direct Reaction of Diacids and Diamines. Macromolecules 1985, 18, 2723-2726.

VanderHart, D. L.; Campbell, G. C.; Briber, R. M., Phase Separation Behavior in Blends of Poly (benzimidazole) and Poly(ether imide). Macromolecules 1992, 25, 4734-4743.

Wijmans, J.G. and Baker, R.W., 1995. The solution-diffusion model: a review. Journal of membrane science, 107(1-2), pp. 1-21.

Yang, T.; Chung, T.-S., High performance ZIF-8/PBI nano-composite membranes for high temperature hydrogen separation consisting of carbon monoxide and water vapor. International Journal of Hydrogen Energy 2013, 38, 229-239.

Yang, T.; Chung, T.-S., Room-temperature synthesis of Z1F-90 nanocrystals and the derived nano-composite membranes for hydrogen separation. Journal of Materials Chemistry A 2013, 1, 6081-6090.

Yang, T.; Shi, G. M.; Chung, T.-S., Symmetric and Asymmetric Zeolitic Imidazolate Frameworks (ZIFs)/Polybenzimidazole (PBI)

(56) References Cited

OTHER PUBLICATIONS

Nanocomposite Membranes for Hydrogen Purification at High Temperatures. Advanced Energy Materials 2012, 2, 1358-1367.
Yang, T.; Xiao, Y.; Chung, T.-S., Poly-/metal-benzimidazole nanocomposite membranes for hydrogen purification. Energy & Environmental Science 2011, 4, 4171-4180.
International Preliminary Report on Patentability issued for Application No. PCT/US2019/025393, dated Oct. 15, 2020.

* cited by examiner

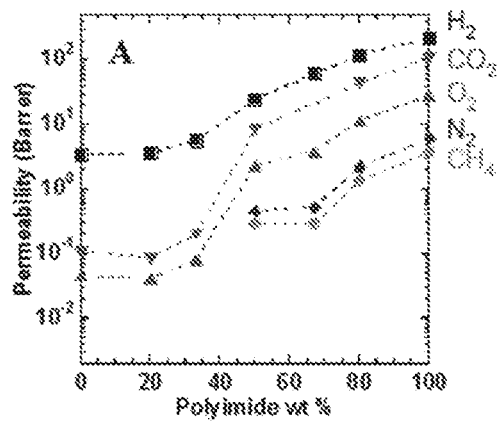 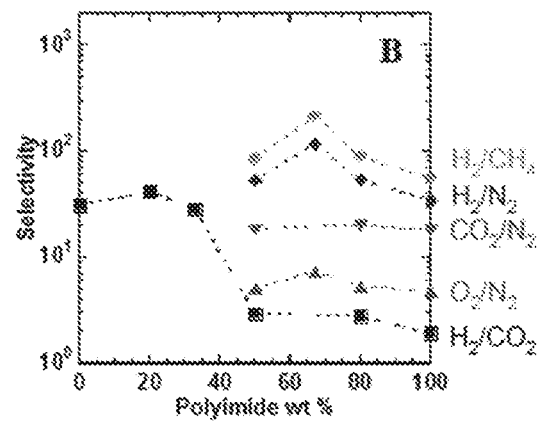
FIG. 15A    FIG. 15B
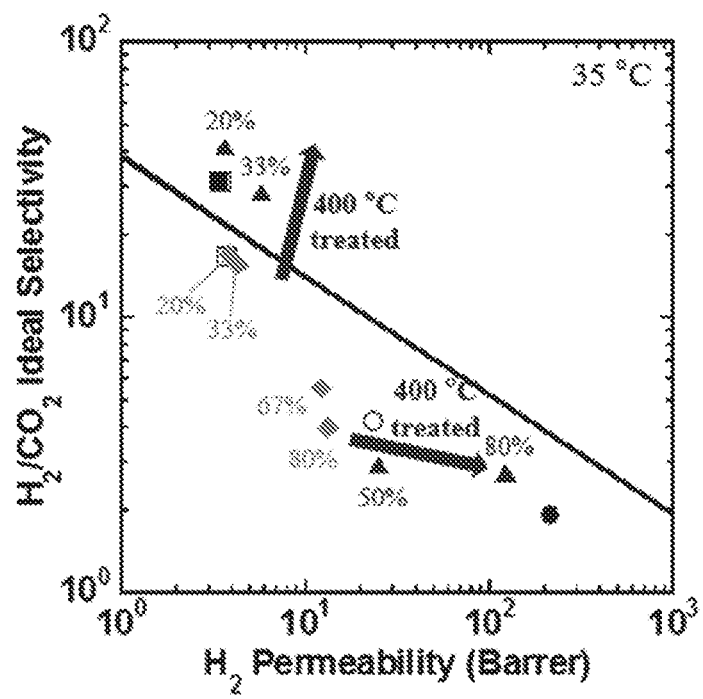
FIG. 16

THERMALLY-REARRANGED POLYMER BLENDS FOR GAS SEPARATION MEMBRANES

STATEMENT ACKNOWLEDGING GOVERNMENT SUPPORT

This invention was made with government support under Grant no. DE-FG02-02ER15362 awarded by the Department of Energy. The government has certain rights in the invention.

BACKGROUND

Polybenzimidazoles (PBIs) have been studied for use as gas separation membranes for aggressive, high-temperature applications such as hydrogen separations due to their high chemical and thermal stability (see e.g., Chung, A Critical Review of Polybenzimidazoles. *J Macromol Sci, Part C* 1997, 37, 277-301; Li, et al, Influence of polybenzimidazole main chain structure on $H_2/CO_2$ separation at elevated temperatures. *J Membr Sci* 2014, 461, 59-68; Berchtold, et al., High temperature polymer based membrane systems for pre-combustion carbon dioxide capture. 2012; Kumbharkar, et al., High performance polybenzimidazole based asymmetric hollow fibre membranes for $H_2/CO_2$ separation. *J Membr Sci* 2011, 375, 231-240; Kumbharkar, et al., Investigation of gas permeation properties of systematically modified polybenzimidazoles by N-substitution. *J Membr Sci* 2010, 357, 134-142; Pesiri, et al., Thermal optimization of polybenzimidazole meniscus membranes for the separation of hydrogen, methane, and carbon dioxide. *J Membr Sci* 2003, 218, 11-18). Most gas permeation experiments for PBIs have primarily targeted $H_2/CO_2$ separation, since $H_2$ removal from gas mixtures with $CO_2$ is integral to pre-combustion carbon capture from streams exiting water-gas shift reactors, which is the primary method of producing $H_2$ for chemical applications.

The most commonly studied PBI for these applications is a commercial PBI known as CELAZOLE™, which is a product of PBI Performance Products, Inc.

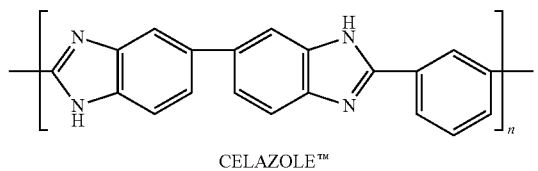

CELAZOLE™

At low temperatures (e.g., 35° C.), CELAZOLE™ demonstrates $H_2/CO_2$ separation performance near the 2008 Robeson upper bound, which represents the performance of current state-of-the-art polymer membranes with respect to the intrinsic trade-off between gas permeability and selectivity (Robeson, The upper bound revisited. *J Membr Sci* 2008, 320, 390-400). At elevated temperatures up to 250° C., CELAZOLE™ exhibits separation properties far in excess of the upper bound due to increased permeabilities (Li, et al., Influence of polybenzimidazole main chain structure on $H_2/CO_2$ separation at elevated temperatures. *J Membr Sci* 2014, 461, 59-68). However, at ambient temperatures, the permeabilities of CELAZOLE™ are very low (e.g., 2.4 Barrer for $H_2$ at 35° C.) and are at the low permeability end of the upper bound. Opportunities exists for improving the permeabilities of PBIs such as CELAZOLE™, which would increase the throughput of a PBI gas separation membrane, requiring less membrane area and compressor costs. Increasing the permeability of PBIs while maintaining good selectivities for gas pairs such as $H_2/CO_2$ would make such technology competitive for pre-combustion carbon capture applications and for emerging applications such as $H_2/CH_4$ and $H_2$/hydrocarbon separations.

Several strategies have already been explored for improving the permeabilities of PBIs. One strategy is to change the chemical structure of the PBI itself by incorporating flexible sulfonyl groups (Borjigin, et al., Synthesis and characterization of polybenzimidazoles derived from tetraaminodiphenylsulfone for high temperature gas separation membranes. *Polymer* 2015, 71, 135-142) or bulky fluorinated or phenylindane groups (Li, et al., Influence of polybenzimidazole main chain structure on $H_2/CO_2$ separation at elevated temperatures. *J Membr Sci* 2014, 461, 59-68), or by functionalizing the imidazole nitrogen with bulky alkyl or aromatic groups (Kumbharkar, et al., Investigation of gas permeation properties of systematically modified polybenzimidazoles by N-substitution. *J Membr Sci* 2010, 357, 134-142; Kumbharkar, et al., New N-substituted ABPBI: Synthesis and evaluation of gas permeation properties. *J Membr Sci* 2010, 360, 418-425). Additional structural variations of PBI have included aromatic, alkyl, hexafluoro, ether, pyridine, benzophenone, biphenyl, and tert-butyl functional groups (Iwakura, et al., Polybenzimidazoles. II. Polyalkylenebenzimidazoles. *Die Makromolekulare Chemie* 1964, 77, 33-40; Kumbharkar, et al., Enhancement of Gas Permeation Properties of Polybenzimidazoles by Systematic Structure Architecture. *J Membr Sci* 2006, 286, 161-169; Ueda, et al., Poly(Benzimidazole) Synthesis by Direct Reaction of Diacids and Diamines. *Macromolecules* 1985, 18, 2723-2726; Li, et al., Synthesis and Characterization of a New Fluorine-Containing Polybenzimidazole (PBI) for Proton-Conducting Membranes in Fuel Cells. *Fuel Cells* 2013, 13, 832-842; Leykin, et al., Some Aspects of Polybenzimidazoles' Synthesis in P2O5 Containing Condensation Media. *Polymer* 2010, 51, 4053-4057; Qian, et al., Synthesis and Characterization of High Molecular Weight Hexafluoroisopropylidene-Containing Polybenzimidazole for High-Temperature Polymer Electrolyte Membrane Fuel Cells. *Journal of Polymer Science Part A: Polymer Chemistry* 2009, 47, 4064-4073; Qian, et al., Synthesis and Characterization of High Molecular Weight Perfluorocyclobutyl-Containing Polybenzimidazoles (PFCB-PBI) for High Temperature Polymer Electrolyte Membrane Fuel Cells. *Polymer* 2009, 50, 3911-3916; Maity, et al., Soluble Polybenzimidazoles for PEM: Synthesized from Efficient, Inexpensive, Readily Accessible Alternative Tetraamine Monomer. *Macromolecules* 2013, 46, 6814-6823). Such materials all suffer from the intrinsic trade-off between permeability and selectivity and are not able to surpass the 2008 $H_2/CO_2$ upper bound.

Another strategy is to form mixed-matrix or nanocomposite membranes using porous fillers such as zeolitic imidazolate frameworks (ZIFs) (see e.g., Yang, et al., Poly-/metal-benzimidazole nano-composite membranes for hydrogen purification. *Energy & Enviro Sci* 2011, 4, 4171-4180; Yang, et al., Symmetric and Asymmetric Zeolitic Imidazolate Frameworks (ZIFs)/Polybenzimidazole (PBI) Nanocomposite Membranes for Hydrogen Purification at High Temperatures. *Adv Energy Mater* 2012, 2, 1358-1367; Yang, et al., Room-temperature synthesis of ZIF-90 nanocrystals and the derived nano-composite membranes for hydrogen separation. *J Mater Chem A* 2013, 1, 6081-6090; Yang, et al., High performance ZIF-8/PBI nano-composite membranes for high temperature hydrogen separation consisting of carbon monoxide and water vapor. *Int'l J Hydrogen Energy* 2013, 38, 229-239; Shi, et al., Sorption, swelling, and free volume of polybenzimidazole (PBI) and PBI/ zeolitic imidazolate framework (ZIF-8) nano-composite membranes for pervaporation. *Polymer* 2013, 54, 774-783). Some of these materials are capable of surpassing the upper bound but are complicated by the additional factors necessary to produce nanocomposite membranes, including aggregation of the ZIFs and the synthesis of expensive nanoparticles at large scales.

A third strategy is to blend the PBI with a more permeable polymer such as a polyimide. For example, Hosseini et al. blended MATRIMID™, a commercial polyimide, with CELAZOLE™ and observed that the two polymers were miscible in all proportions (Hosseini, et al., Hydrogen separation and purification in membranes of miscible polymer blends with interpenetration networks. *Polymer* 2008, 49, 1594-1603). Compositions of 25/75, 50/50, and 75/25 wt % MATRIMID™ and PBI were studied. Blended polymer films were formed via solution casting in N-methyl-2-pyrrolidinone (NMP) and dried under vacuum at temperatures up to 250° C. Increasing the polyimide content increased gas permeabilities but decreased $H_2/CO_2$ selectivities and did not exceed the 2008 $H_2/CO_2$ upper bound.

Panapitiya et al. reported blends of CELAZOLE™ with a fluorinated polyimide, 6FDA-DAM:DABA (3:2), referred to in their work as "6FDD" (Panapitiya, et al., Gas Separation Membranes Derived from High-Performance Immiscible Polymer Blends Compatibilized with Small Molecules. *ACS Applied Materials & Interfaces* 2015, 7, 18618-18627). These blends containing 50% polyimide and 50% PBI were formed via solution casting in DMAc and dried under vacuum at temperatures up to 250° C. Solutions were concentrated to induce phase separation, and this resulted in immiscible blends of the two polymers. Membranes were also prepared by adding 5 and 9 wt % 2-methylimidazole as a compatibilizing agent which increased the interfacial area between the two polymers, resulting in smaller sizes of the dispersed polyimide phase. The 50:50 PBI:PI blend without 2-methylimidazole showed a $H_2$ permeability of 7.5 Barrer and $H_2/CO_2$ selectivity of 10.3. The 50:50 PBI:PI blend with 9 wt % 2-methylimidazole showed a lower $H_2$ permeability of 4.0 Barrer and a much higher $H_2/CO_2$ selectivity of 40.4, surpassing the 2008 Robeson upper bound for $H_2/CO_2$ separation. This study showed a significantly higher $H_2/CO_2$ selectivity for a PBI/polyimide blend than pure CELAZOLE™. Panapitiya et al. also reported compatibilization of immiscible PBI/polyimide blends using metal organic frameworks (MOFs) (Panapitiya, et al., Stabilization of immiscible polymer blends using structure directing metal organic frameworks (MOFs). *Polymer* 2014, 55, 2028-2034) and colloidal zeolitic imidazolate framework nanoparticles (ZIF-8) (Panapitiya, et al., Compatibilized Immiscible Polymer Blends for Gas Separations. *Materials* 2016, 9, 643).

Further examples of polyimide/PBI blends are found in U.S. Pat. No. 7,950,529, which provides examples of fibers spun from blends of CELAZOLE™ and P84 polyimide and reports He and $N_2$ gas permeabilities. A review of PBIs by Tai-Shung Chung in 1997 reported various PBI blends including "miscible blends, immiscible blends, and blends of PBI fiber and other fibers" (Chung, A Critical Review of Polybenzimidazoles. *J Macromol Sci, Part C* 1997, 37, 277-301). The polymers blended with CELAZOLE™ in the works cited in the review included commercial polyimides such as Ultem 1000 (FAdes, et al., Interaction, miscibility and phase inversion in PBI/PI blends. *Polymer* 2000, 41, 975-983), XU 218 (also known as MATRIMID™) (Leung, et al., Miscible blends of aromatic polybenzimidazoles and aromatic polyimides. *Polymer Bulletin* 1986, 16, 457-464), Dow 2080 (Guerra, et al., Miscible polybenzimidazole blends with a benzophenone-based polyimide. *J Polymer Sci Part B: Polymer Physics* 1988, 26, 301-313), and LaRC TPI (Id), fluorinated polyimides (Jaffe, et al., High performance polymer blends. In High Performance Polymers, Springer, Berlin, Heidelberg: 1994; pp 297-327), and other polyimides (Ahn, et al., Hydrogen-Bonding Strength in the Blends of Polybenzimidazole with BTDA- and DSDA-Based Polyimides. *Macromolecules* 1997, 30, 3369-3374).

PBI has also been co-polymerized with a more permeable fluorinated PBI (Singh, et al., Polybenzimidazole based random copolymers containing hexafluoroisopropylidene functional groups for gas separations at elevated temperatures. *Polymer* 2017, 119, 134-141).

While some of these strategies have meet with success, new compositions and methods for improving the permeabilities and selectivities of PBI membranes are still needed. The compositions and methods disclosed herein address these and other needs.

SUMMARY

Disclosed herein are compounds, compositions, methods for making and using such compounds and compositions. In further aspects, disclosed herein are polymer blends comprising an ortho-functionalized polyimide homo or copolymer and a polybenzimidazole homo or copolymer, wherein the ortho-functionalized polyimide thermally rearranges to lose the ortho-positional functional groups and form a heterocyclic structure, such as, but not limited to, polybenzoxazole, polybenzothiazole, and/or polybenzimidazole upon heating. In further aspects, disclosed are methods of forming a polymer blend comprising dissolving an ortho-functionalized polyimide homo or copolymer and a polybenzimidazole homo or copolymer in a solvent to form a polymer solution; contacting a support with the polymer solution; and evaporating the solvent to provide a thin layer comprising the polymer blend on the support. Further, methods of heat-treating polymer blends to thermally rearrange an ortho-functionalized polyimide homo or copolymer into polybenzoxazole, polybenzothiazole, polybenzimidazole and/or other heterocyclic structure are disclosed. Further disclosed herein are polymer blends comprising a thermally rearranged ortho-functionalized polyimide homo or copolymer and a polybenzimidazole homo or copolymer, wherein the thermally rearranged ortho-functionalized polyimide is a polymer comprising a phenylene heterocyclic group, such as, but not limited to, polybenzoxazole, polybenzothiazole, and/or polybenzimidazole. Methods of using polymer blends to separate gases are also disclosed.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is in no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

BRIEF DESCRIPTIONS OF THE FIGURES

The accompanying figures, which are incorporated in and constitute a part of this specification, illustrate several aspects and together with the description serve to explain the principles of the invention.

FIGS. 1A, 1B, 1C, and 1D are optical microscope images of CELAZOLE™/HAB-6FDA-CI blends without 1-methylimidazole containing 33 wt % HAB-6FDA-CI (FIG. 1A), 40 wt % HAB-6FDA-CI (FIG. 1B), 50 wt % HAB-6FDA-CI (FIG. 1C), or 67 wt % HAB-6FDA-CI (FIG. 1D), with the remaining component being CELAZOLE™.

FIGS. 2A, 2B, 2C, and 2D are optical microscope images of CELAZOLE™/HAB-6FDA-CI blends with 9.1 wt % 1-methylimidazole containing 30 wt % HAB-6FDA-CI (FIG. 2A), 36.4 wt % HAB-6FDA-CI (FIG. 2B), 45.5 wt % HAB-6FDA-CI (FIG. 2C), or 60.9 wt % HAB-6FDA-CI (FIG. 2D), with the remaining component being CELAZOLE™.

Figure 3:
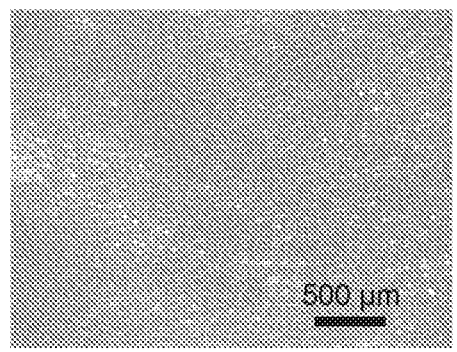
Figure 4A:
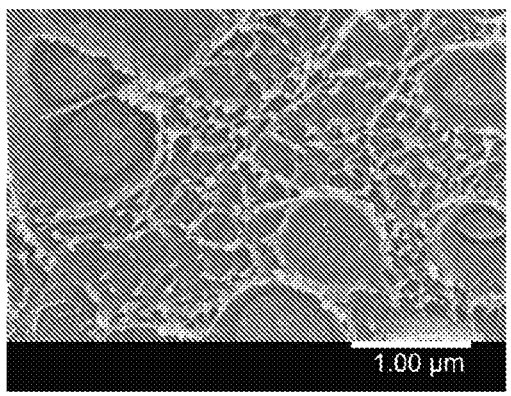
Figure 4B:
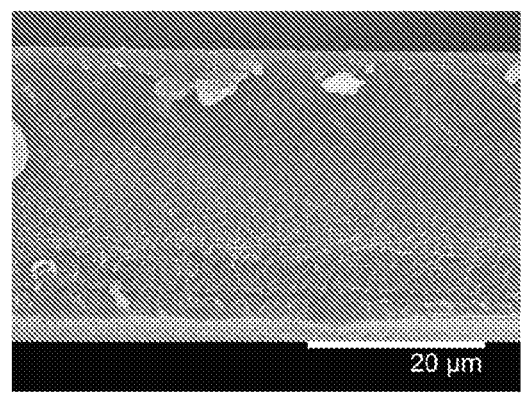
Figure 4C:
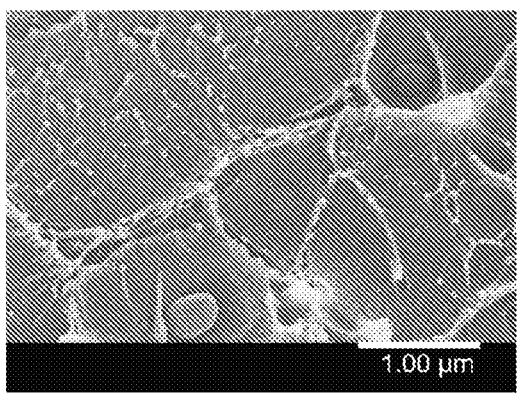
Figure 4D:
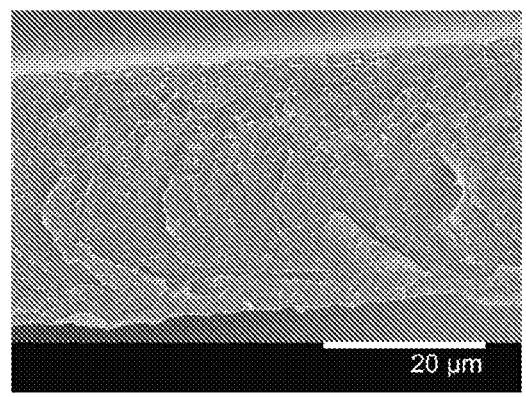
Figure 5A:
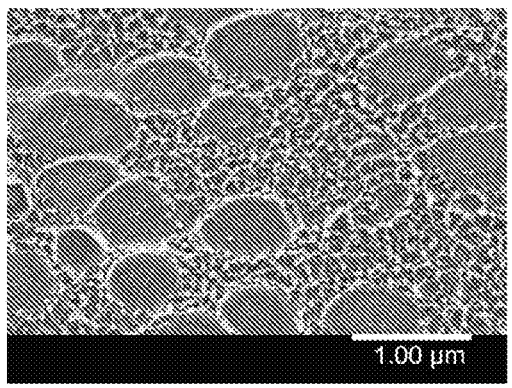
Figure 5B:
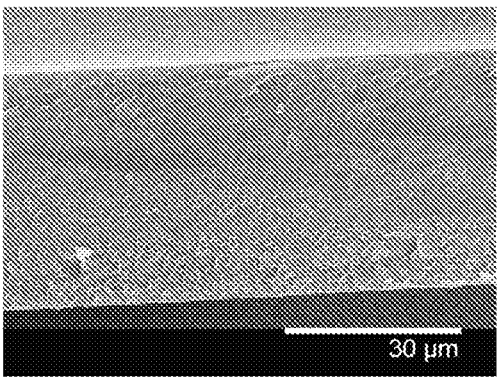
Figure 5C:
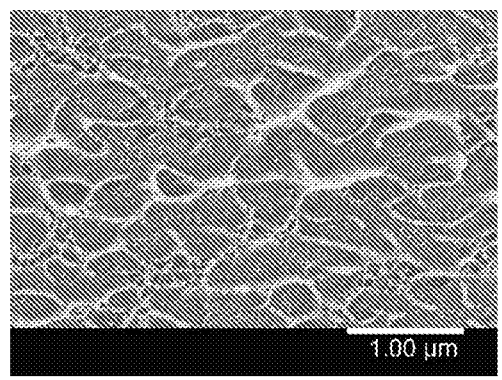
Figure 5D:
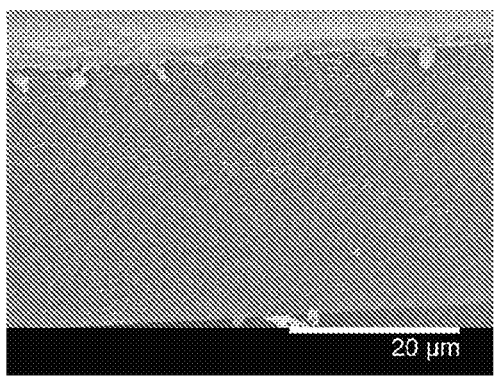
Figure 5E:
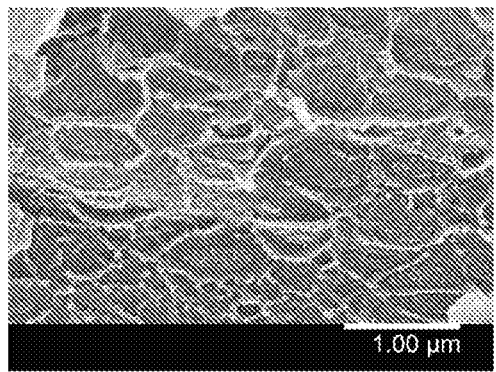
Figure 5F:
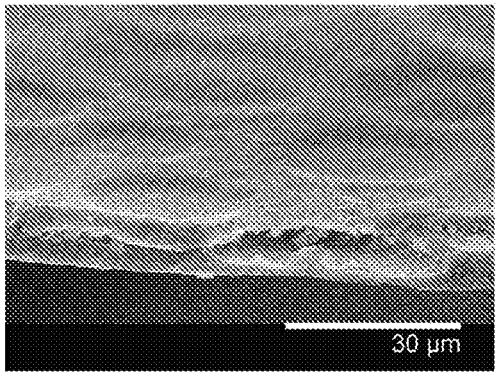
Figure 5G:
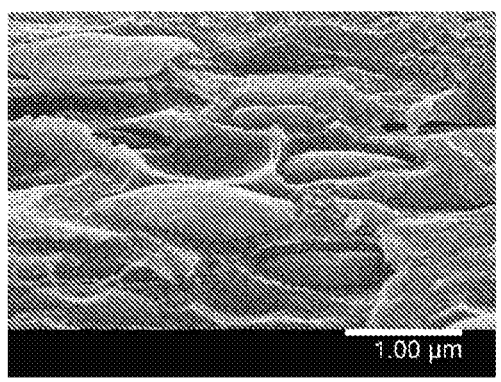
Figure 5H:
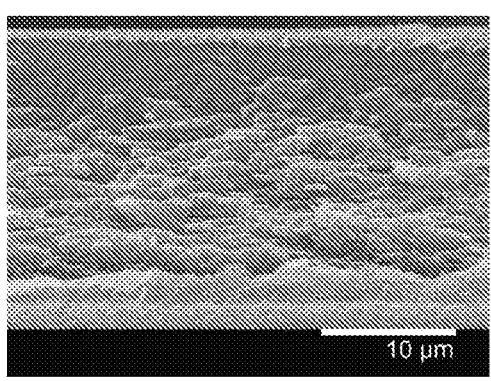
Figure 5J:
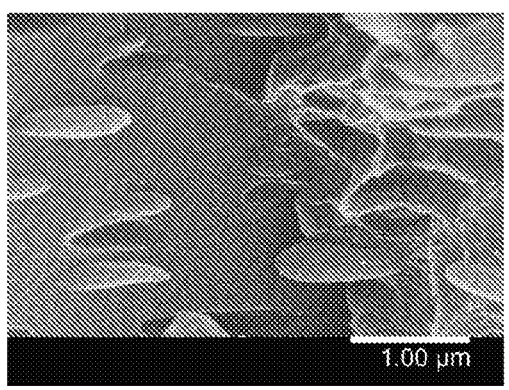
Figure 5K:
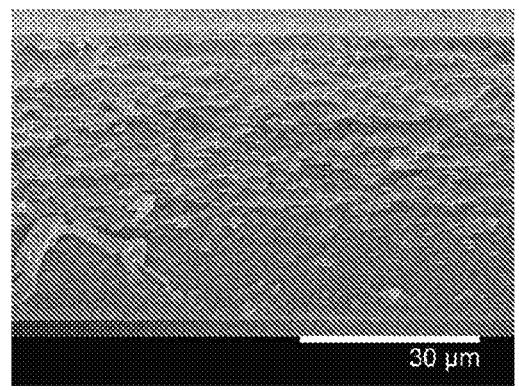
Figure 6A:
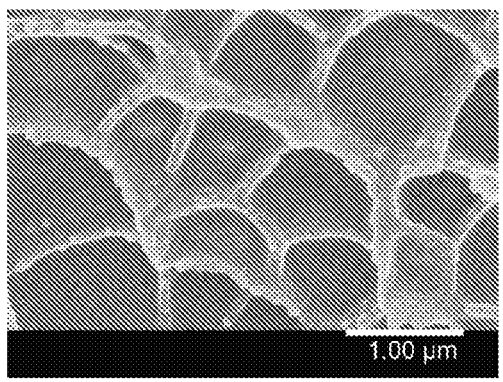
Figure 6B:
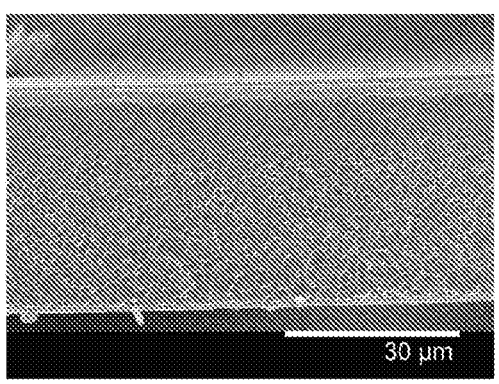
Figure 6C:
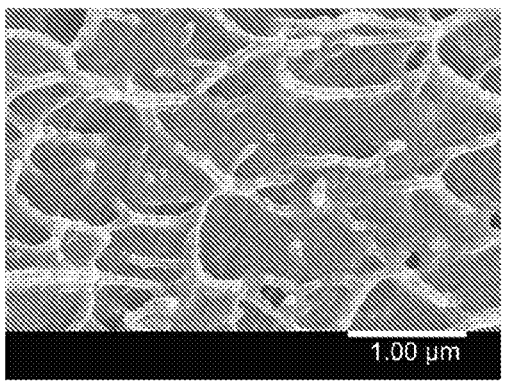
Figure 6D:
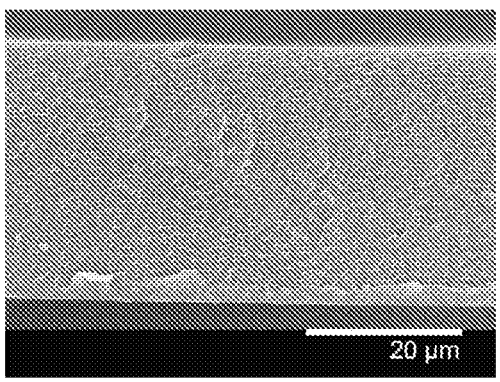
Figure 6E:
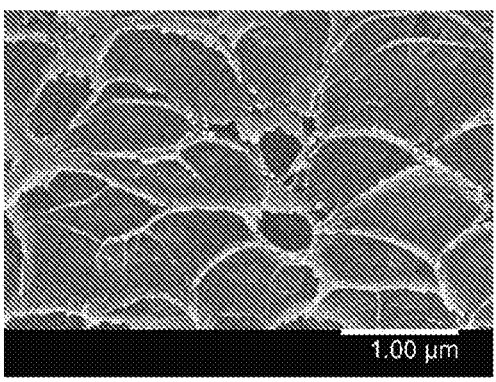
Figure 6F:
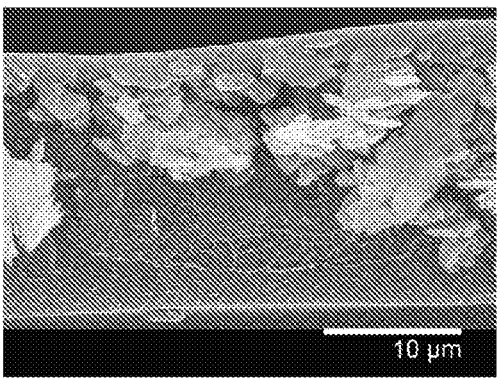
Figure 6G:
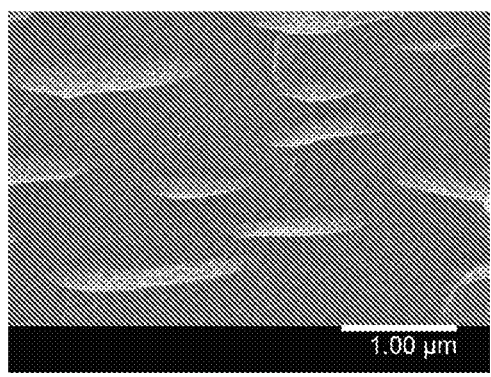
Figure 6H:
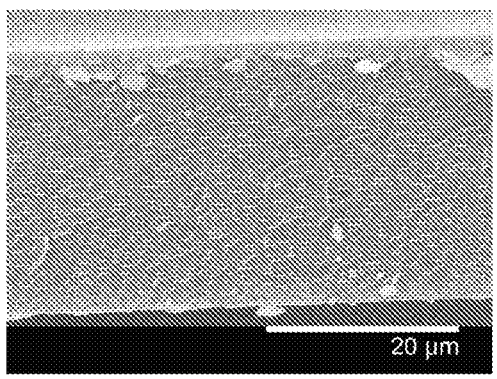
Figure 6J:
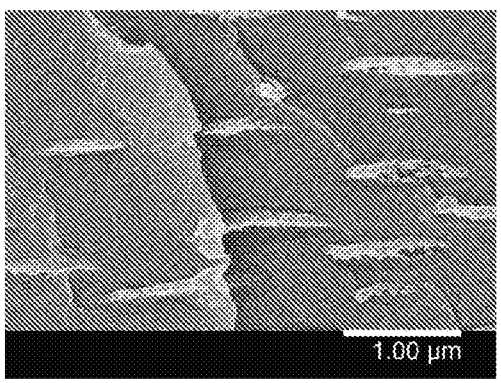
Figure 6K:
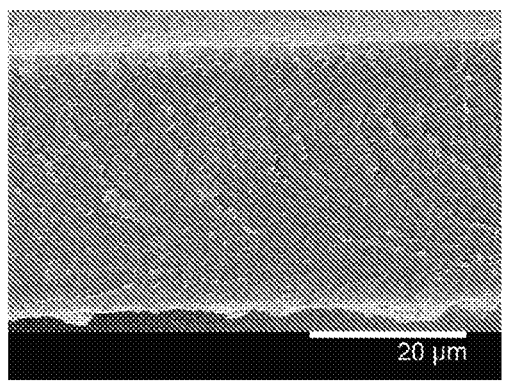

FIG. 3 is an optical microscope image of a CELAZOLE™/HAB-6FDA-PA blend with 9.1 wt % lithium chloride as a phase compatibilizer containing 45.5 wt % HAB-6FDA-PA and 45.5 wt % CELAZOLE™.

FIGS. 4A, 4B, 4C, and 4D are cross-sectional scanning electron microscope (SEM) images of CELAZOLE™/HAB-6FDA-CI blends without 1-methylimidazole containing 20 wt % HAB-6FDA-CI (FIGS. 4A and 4B) or 33 wt % HAB-6FDA-CI (FIGS. 4C and 4D), with the remaining component being CELAZOLE™.

FIGS. 5A, 5B, 5C, 5D, 5E, 5F, 5G, 5H, 5J, and 5K are cross-sectional scanning electron microscope (SEM) images of CELAZOLE™/HAB-6FDA-CI blends with 9.1 wt % 1-methylimidazole before heat treatment containing 18.2 wt % HAB-6FDA-CI (FIGS. 5A and 5B), 30 wt % HAB-6FDA-CI (FIGS. 5C and 5D), 45.5 wt % HAB-6FDA-CI (FIGS. 5E and 5F), 60.9 wt % HAB-6FDA-CI (FIGS. 5G and 5H), or 72.7 wt % HAB-6FDA-CI (FIGS. 5J and 5K), with the remaining component being CELAZOLE™.

FIGS. 6A, 6B, 6C, 6D, 6E, 6F, 6G, 6H, 6J, and 6K are cross-sectional scanning electron microscope (SEM) images of CELAZOLE™/HAB-6FDA-CI blends with 9.1 wt % 1-methylimidazole after 400° C. heat treatment containing 18.2 wt % HAB-6FDA-CI (FIGS. 6A and 6B), 30 wt % HAB-6FDA-CI (FIGS. 6C and 6D), 45.5 wt % HAB-6FDA-CI (FIGS. 6E and 6F), 60.9 wt % HAB-6FDA-CI (FIGS. 6G and 6H), or 72.7 wt % HAB-6FDA-CI (FIGS. 6J and 6K), with the remaining component being CELAZOLE™.

Figure 7A:
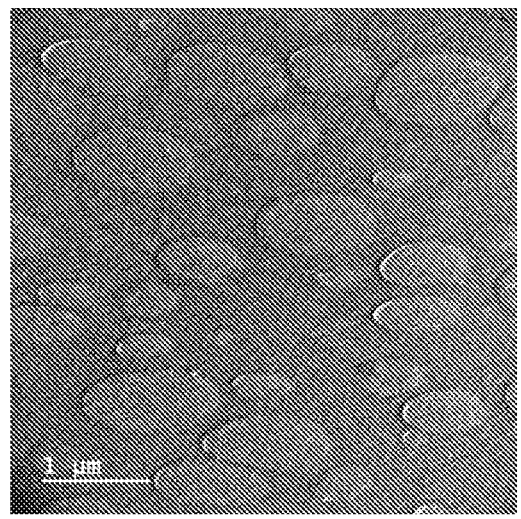
Figure 7B:
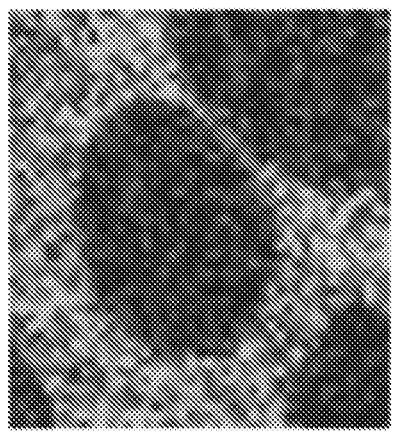
Figure 7C:
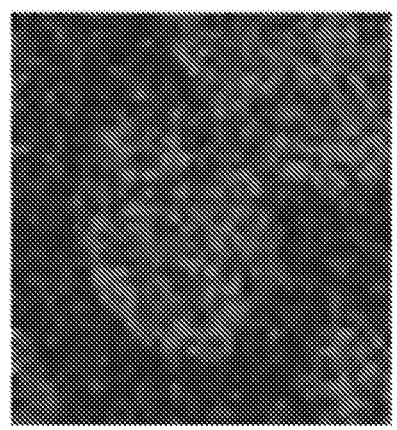
Figure 7D:
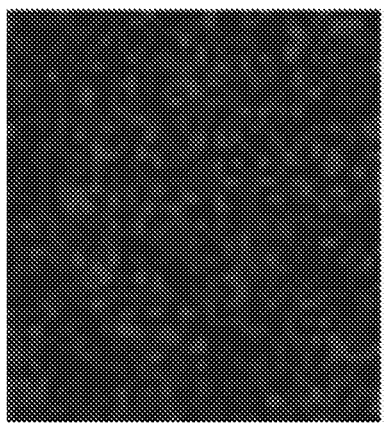
Figure 7E:
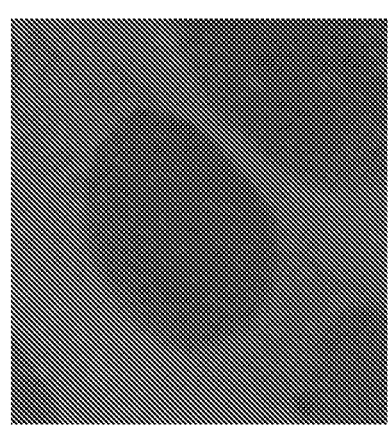

FIG. 7A is a transmission electron microscope (TEM) image of a CELAZOLE™/HAB-6FDA-CI blend with 9.1 wt % 1-methylimidazole before heat treatment containing 30 wt % HAB-6FDA-CI, with the remaining component being CELAZOLE™. FIGS. 7B, 7C, and 7D are energy-dispersive x-ray spectroscopy (EDS) maps for the same composition as FIG. 7A, where FIG. 7B shows nitrogen content, FIG. 7C shows oxygen content, and FIG. 7D shows fluorine content. Bright regions indicate areas with high x-ray counts that indicate the abundance of the specified element. FIG. 7E is a scanning transmission electron microscope (STEM) image for the sample area used for EDS mapping in FIGS. 7B, 7C, and 7D.

Figure 8A:
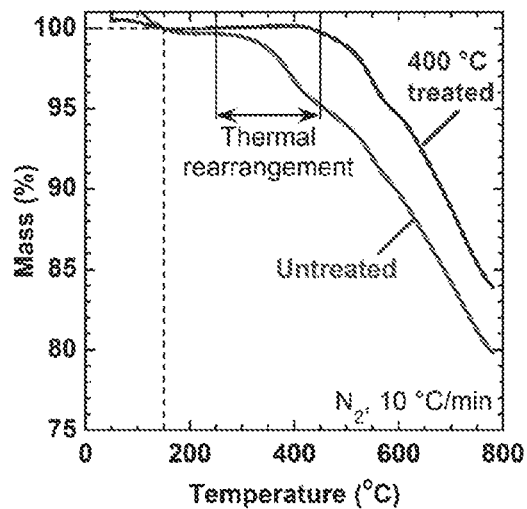
Figure 8B:
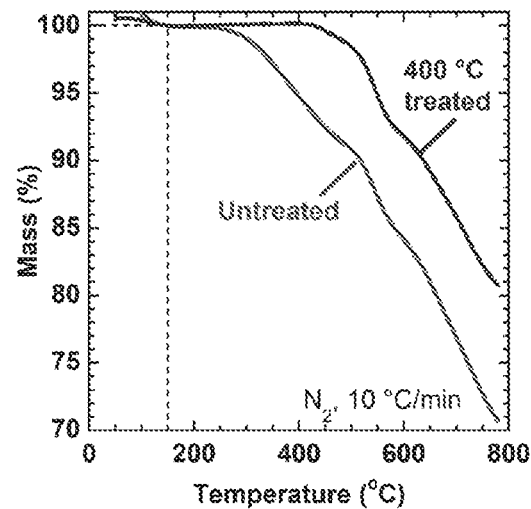
Figure 8C:
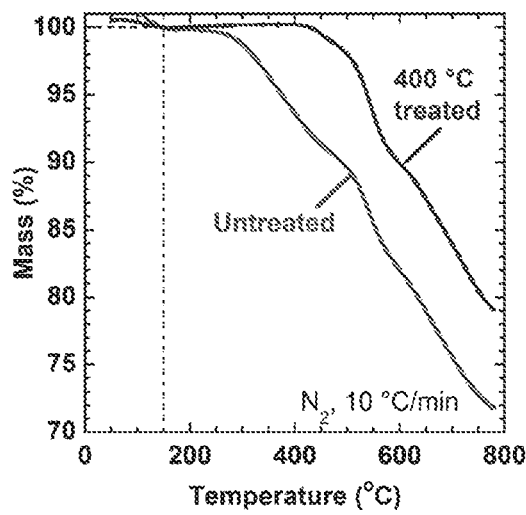
Figure 9A:
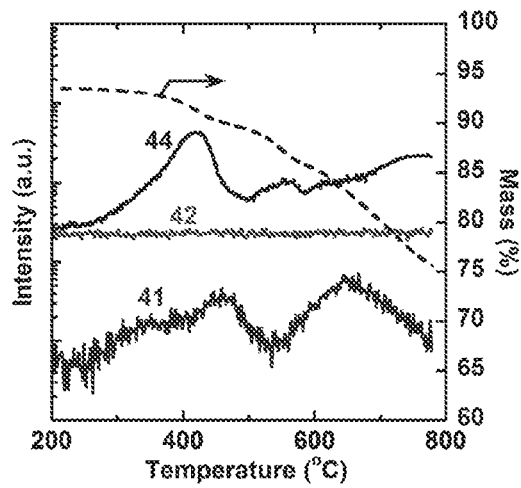
Figure 9B:
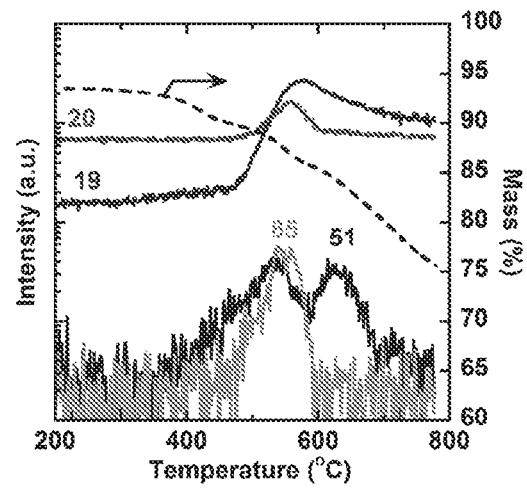
Figure 9C:
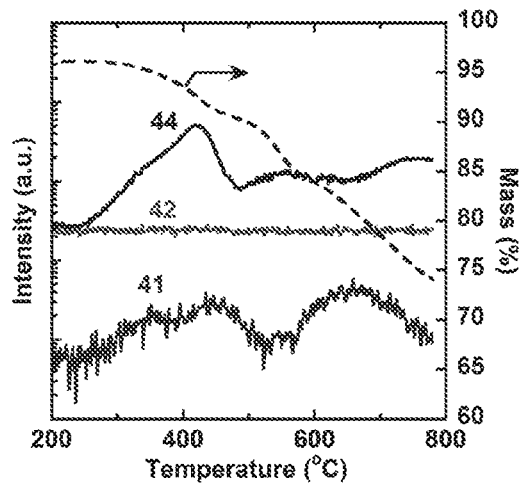
Figure 9D:
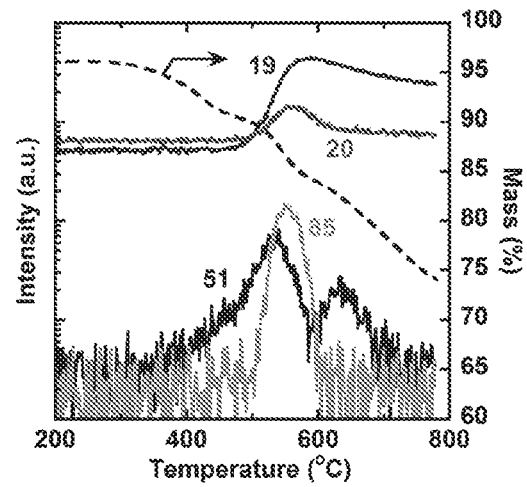
Figure 9E:
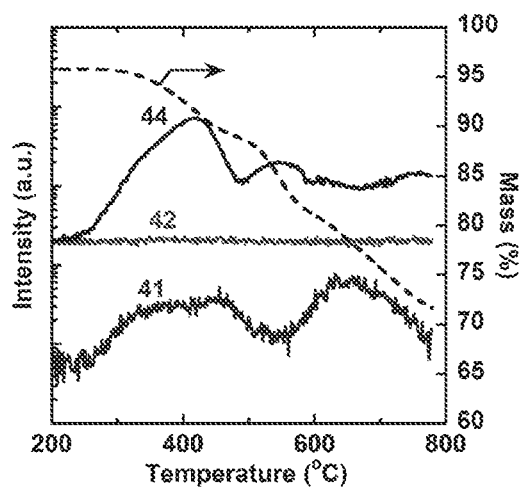
Figure 9F:
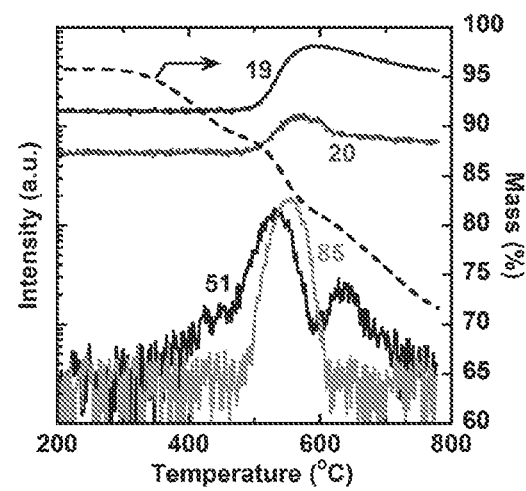

FIGS. 8A, 8B, and 8C are thermogravimetric analysis (TGA) thermograms of CELAZOLE™/HAB-6FDA-CI blends with 9.1 wt % 1-methylimidazole containing 18.2 wt % HAB-6FDA-CI (FIG. 8A), 30 wt % HAB-6FDA-CI (FIG. 8B), or 36.4 wt % HAB-6FDA-CI (FIG. 8C), with the remaining component being CELAZOLE™. Green curves are before heat treatment, and red curves are after 400° C. heat treatment. Scans were run under nitrogen at a ramp rate of 10° C./min. Mass percentages were normalized based on sample dry mass at 150° C.

FIGS. 9A, 9B, 9C, 9D, 9E, and 9F are thermogravimetric analysis with mass spectrometry (TGA-MS) plots for CELAZOLE™/HAB-6FDA-CI blends with 9.1 wt % 1-methylimidazole containing 18.2 wt % HAB-6FDA-CI (FIGS. 9A and 9B), 30 wt % HAB-6FDA-CI (FIGS. 9C and 9D), or 36.4 wt % HAB-6FDA-CI (FIGS. 9E and 9F), with the remaining component being CELAZOLE™. Blends were not heat treated. Dashed curves represent sample mass loss. Scans were run under nitrogen at a ramp rate of 10° C./min.

Figure 10A:
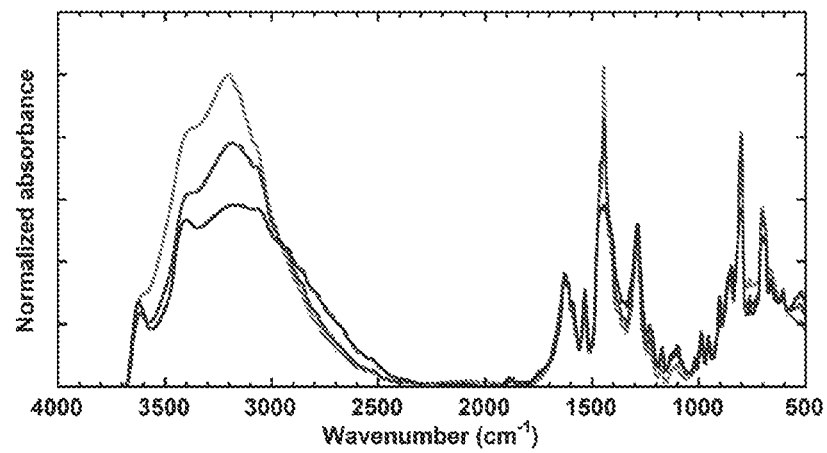
Figure 10B:
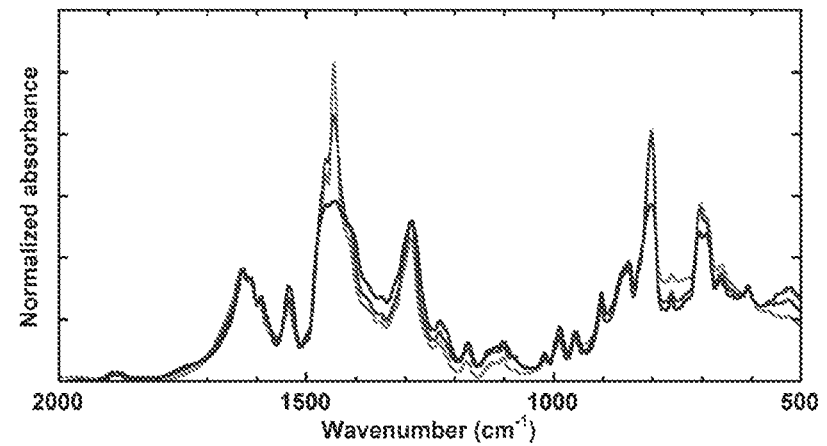

FIGS. 10A and 10B are Fourier transform infrared spectroscopy (FTIR) plots for CELAZOLE™ with and without 9.1 wt % 1-methylimidazole compatibilizer before heat treatment and CELAZOLE™ with 9.1 wt % 1-methylimidazole compatibilizer after 400° C. heat treatment. Absorbances were normalized using 1630 cm$^{-1}$ peak. FIG. 10B highlights 2000 to 500 cm$^{-1}$ range. (~1612 cm$^{-1}$: C=C/C=N str, 1443 cm$^{-1}$: in-plane benzimidazole vib, 801 and 705 cm$^{-1}$: heterocyclic ring vib and/or aromatic C—H bending)

Figure 1B:
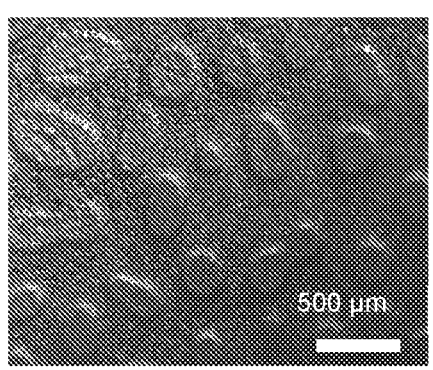
Figure 1C:
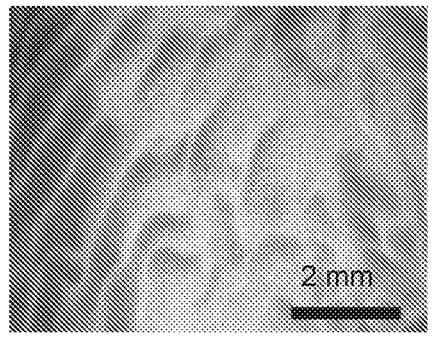
Figure 1D:
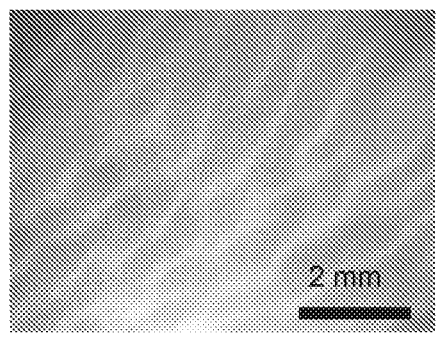
Figure 2A:
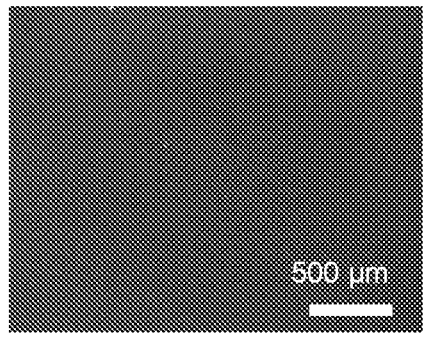
Figure 2B:
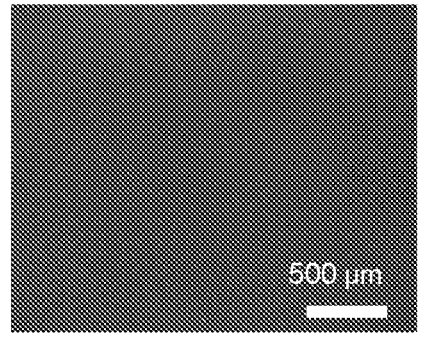
Figure 2C:
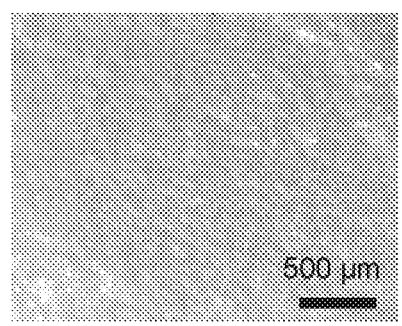
Figure 2D:
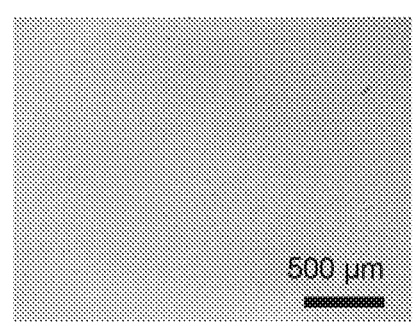
Figure 11A:
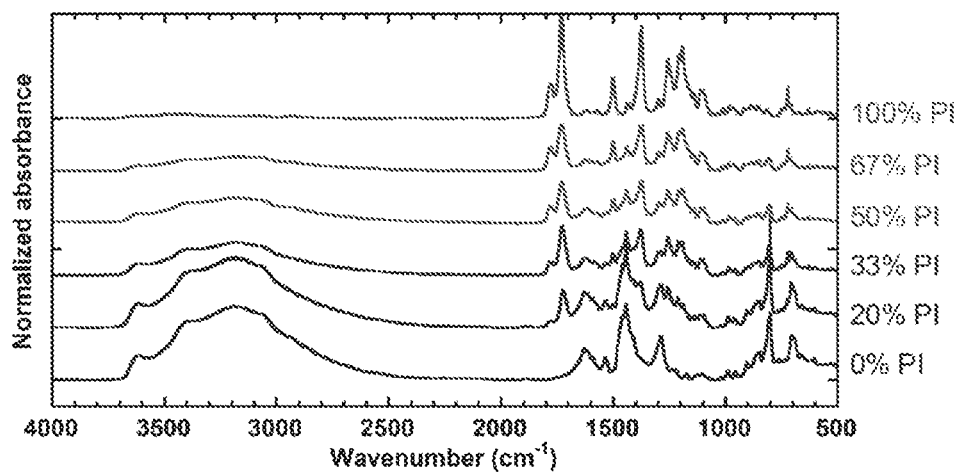
Figure 11B:
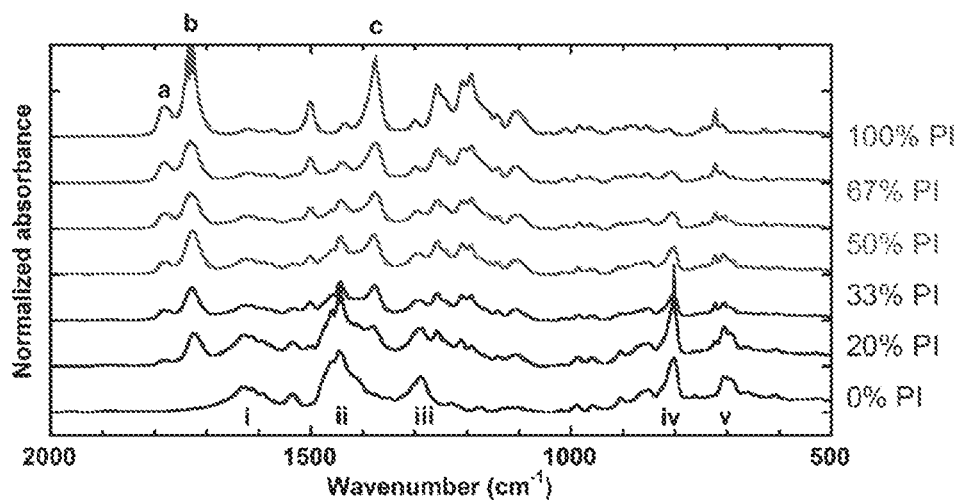

FIGS. 11A and 1B are Fourier transform infrared spectroscopy (FTIR) plots for CELAZOLE™/HAB-6FDA-CI blends compatibilized with 9.1 wt % 1-methylimidazole. Blends were not heat treated. Absorbances were normalized using 1630 and 1730 cm$^{-1}$ peaks. FIG. 11B highlights 2000 to 500 cm$^{-1}$ range. (a,b=imide str, c=C—N imide str, d,e=benzoxazole str, i=imidazole str, ii=benzimidazole vib, iii=imidazole ring breathing, iv,v=heterocyclic vib.)

Figure 12A:
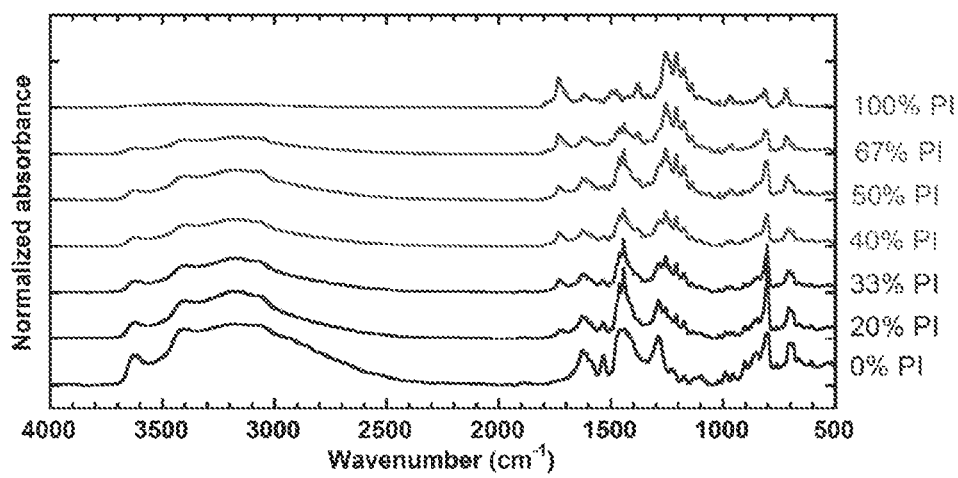
Figure 12B:
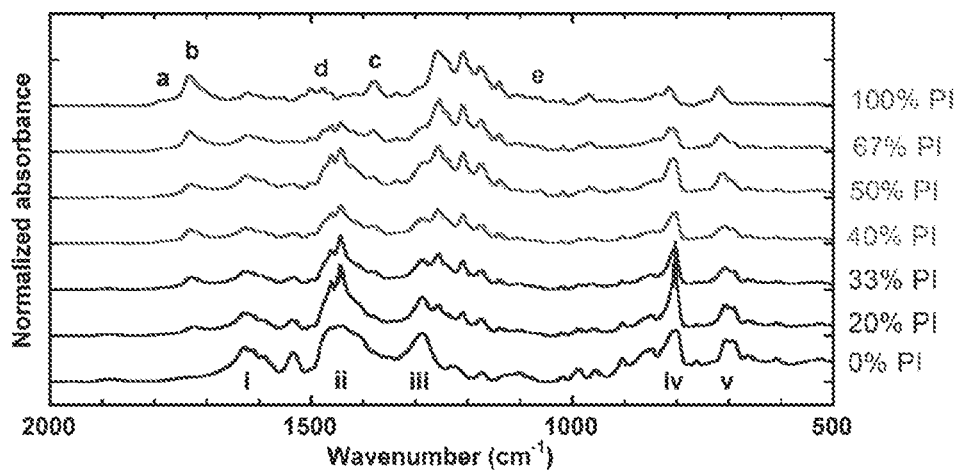

FIGS. 12A and 12B are Fourier transform infrared spectroscopy (FTIR) plots for CELAZOLE™/HAB-6FDA-CI blends compatibilized with 9.1 wt % 1-methylimidazole. Blends were heat treated at 400° C. Absorbances are normalized using 1630 and 1730 cm$^{-1}$ peaks. FIG. 12B highlights 2000 to 500 cm$^{-1}$ range. (a,b=imide str, c=C—N imide str, d,e=benzoxazole str, i=imidazole str, ii=benzimidazole vib, iii=imidazole ring breathing, iv,v=heterocyclic vib.)

Figure 13:
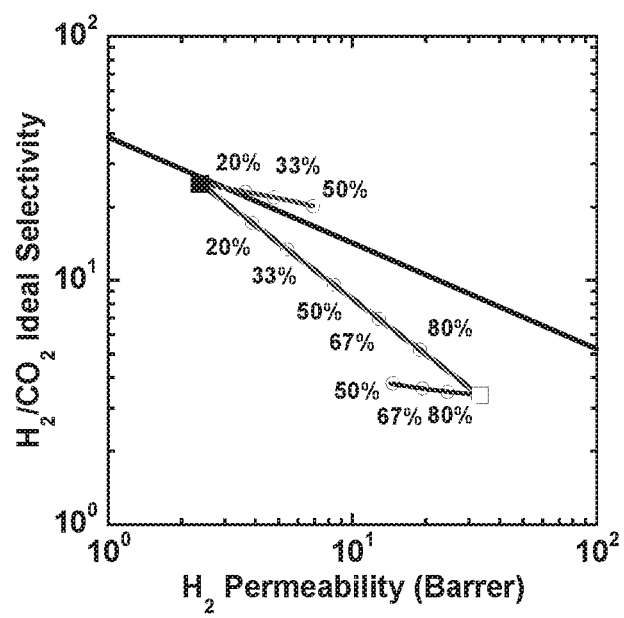

FIG. 13 is an upper bound plot showing $H_2$ permeabilities and $H_2/CO_2$ selectivities for CELAZOLE™ (filled square) and HAB-6FDA-CI (unfilled square) at 35° C. Top and bottom curves and circles show predictions from the Maxwell model for PBI-continuous and polyimide-continuous immiscible blends, respectively. The middle curve and circles show predictions from the additive model for miscible PBI/polyimide blends. Percentages are weight percent polyimide. The black line represents the 2008 upper bound.

Figure 14A:
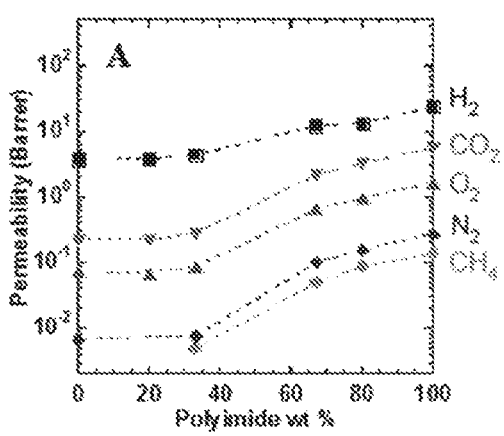
Figure 14B:
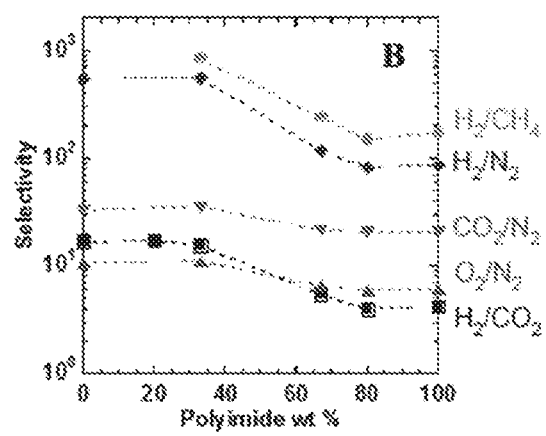
Figure 17A:
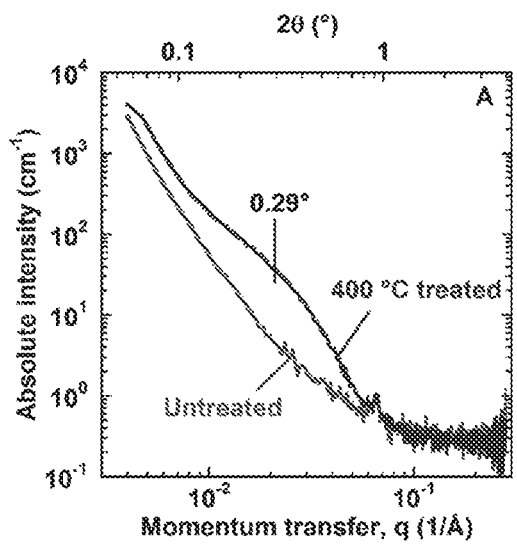
Figure 17B:
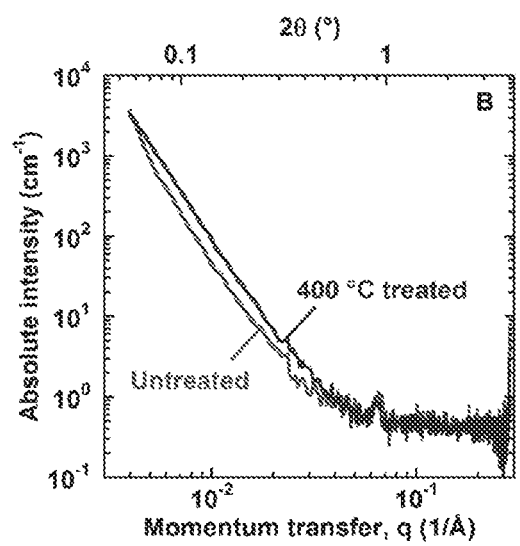
Figure 17C:
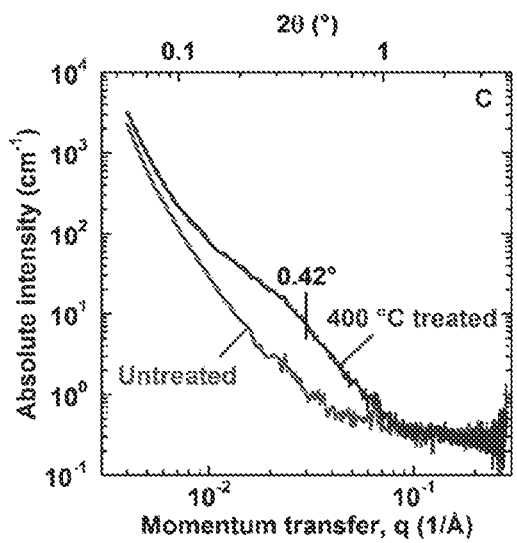
Figure 17D:
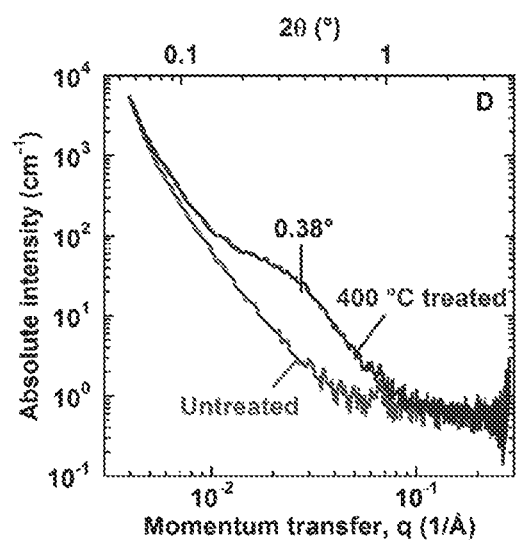
Figure 18A:
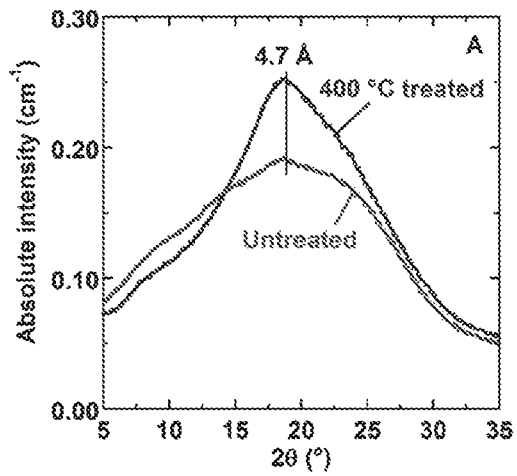
Figure 18B:
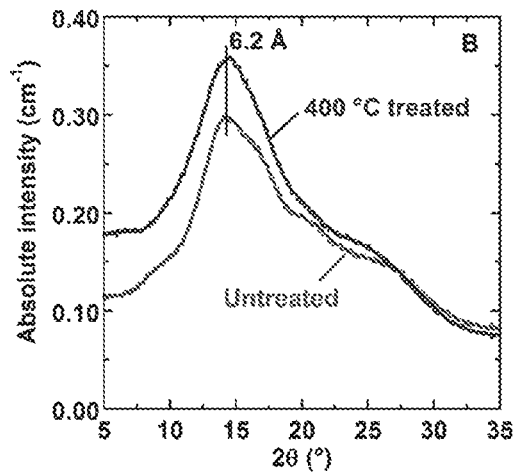
Figure 18C:
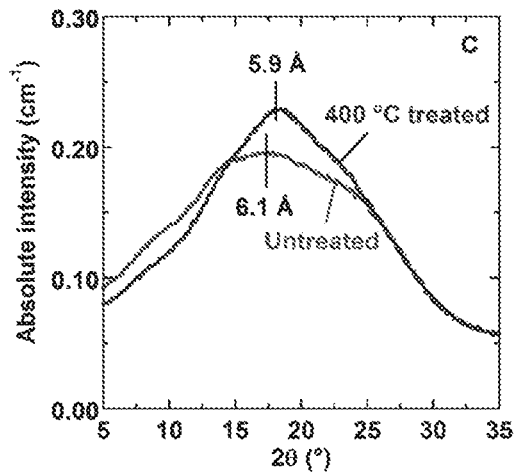
Figure 18D:
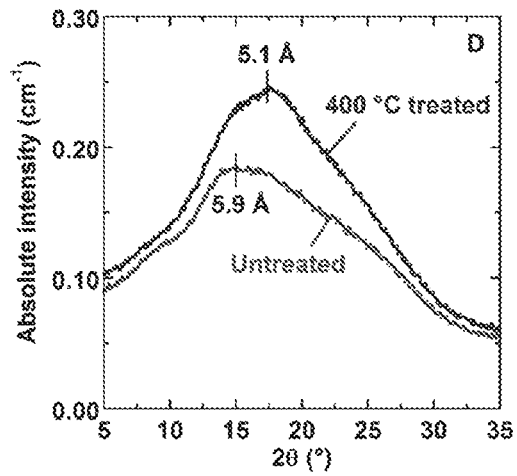

FIG. 14A is a plot of gas permeabilities and FIG. 14B is a plot of gas selectivities in non-heat treated CELAZOLE™/HAB-6FDA-CI blends with 9.1 wt % 1-methylimidazole compatibilizer at 35° C. and 10 atm. The weight percent of polyimide is given as the amount in the blend after casting (i.e., after 1-methylimidazole is removed). Some values are missing since the permeabilities were too low to measure reliably.

FIG. 15A is a plot of gas permeabilities and FIG. 15B is a plot of gas selectivities in thermally rearranged CELAZOLE™/HAB-6FDA-CI blends with 9.1 wt % 1-methylimidazole compatibilizer at 35° C. and 10 atm. The weight percent of polyimide is given as the amount in the blend after casting (i.e., after 1-methylimidazole is removed). Some values are missing since the permeabilities were too low to measure reliably.

FIG. 16 is a $H_2/CO_2$ upper bound plot showing trade-off between $H_2$ permeability and $H_2/CO_2$ selectivity at 35° C. Unfilled black square is untreated CELAZOLE™ with 1-methylimidazole, filled black square is heat treated CELAZOLE™ with 1-methylimidazole, unfilled black circle is untreated HAB-6FDA-CI with 1-methylimidazole, and filled black circle is heat treated HAB-6FDA-CI with 1-methylimidazole. Filled light grey diamonds are untreated HAB-6FDA-CI/CELAZOLE™ with 1-methylimidazole blends, and filled dark grey diamonds are heat treated HAB-6FDA-CI/CELAZOLE™ with 1-methylimidazole blends. Percentages are weight percent polyimide after casting (i.e., after 1-methylimidazole is removed).

FIGS. 17A, 17B, 17C, and 17D are small angle x-ray scattering (SAXS) plots for CELAZOLE™ cast with 9.1 wt % 1-methylimidazole (FIG. 17A), HAB-6FDA-CI cast with 9.1 wt % 1-methylimidazole (FIG. 17B), and CELAZOLE™/HAB-6FDA-CI blends with 9.1 wt % 1-methylimidazole containing 18.2 wt % HAB-6FDA-CI (FIG. 17C) or 30 wt % HAB-6FDA-CI (FIG. 17D), with the remaining component being CELAZOLE™ Green curves are for films without heat treatment, and red curves are for films treated at 400° C. Intensities were corrected for film thicknesses to permit quantitative comparisons between samples.

FIGS. 18A, 18B, 18C, and 18D are wide angle x-ray scattering (WAXS) plots for CELAZOLE™ cast with 9.1 wt % 1-methylimidazole (FIG. 18A), HAB-6FDA-CI cast with 9.1 wt % 1-methylimidazole (FIG. 18B), and CELAZOLE™/HAB-6FDA-CI blends with 9.1 wt % 1-methylimidazole containing 18.2 wt % HAB-6FDA-CI (FIG. 18C) or 30 wt % HAB-6FDA-CI (FIG. 18D), with the remaining component being CELAZOLE™ Green curves are for films without heat treatment, and red curves are for films treated at 400° C. Intensities were corrected for film thicknesses to permit quantitative comparisons between samples.

DETAILED DESCRIPTION

The present invention can be understood more readily by reference to the following detailed description of the invention and the Examples and Figures included herein.

Before the present compounds, compositions, articles, systems, devices, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

General Definitions

In this specification and in the claims that follow, reference will be made to a number of terms, which shall be defined to have the following meanings:

Throughout the specification and claims the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the polymer" includes mixtures of two or more such polymers, and the like.

"Optional" or "optionally" means that the subsequently described event or circumstance can or cannot occur, and that the description includes instances where the event or circumstance occurs and instances where it does not.

Notwithstanding that the numerical ranges and parameters setting forth the broad scope of the disclosure are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used. Further, ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. Unless stated otherwise, the term "about" means within 5% (e.g., within 2% or 1%) of the particular value modified by the term "about."

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

Chemical Definitions

As used herein, the term "composition" is intended to encompass a product comprising the specified ingredients in the specified amounts, as well as any product which results, directly or indirectly, from combination of the specified ingredients in the specified amounts.

References in the specification and concluding claims to parts by weight of a particular element or component in a composition denotes the weight relationship between the element or component and any other elements or components in the composition or article for which a part by weight is expressed. Thus, in a mixture containing 2 parts by weight of component X and 5 parts by weight component Y, X and Y are present at a weight ratio of 2:5 and are present in such ratio regardless of whether additional components are contained in the mixture.

A weight percent (wt %) of a component, unless specifically stated to the contrary, is based on the total weight of the formulation or composition in which the component is included.

As used herein, "molecular weight" refers to number-average molecular weight as measured by $^1$H NMR spectroscopy, unless clearly indicated otherwise.

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valencies of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc.

The term "aliphatic" as used herein refers to a non-aromatic hydrocarbon group and includes branched and unbranched, alkyl, alkenyl, or alkynyl groups.

The term "alkyl" as used herein is a branched or unbranched saturated hydrocarbon group of 1 to 20 carbon atoms, such as methyl, ethyl, n-propyl, isopropyl, n-butyl, isobutyl, t-butyl, pentyl, hexyl, heptyl, octyl, nonyl, decyl, dodecyl, tetradecyl, hexadecyl, eicosyl, tetracosyl, and the like. The alkyl group can also be substituted or unsubstituted. The alkyl group can be substituted with one or more groups including, but not limited to, alkyl, alkoxy, alkenyl, alkynyl, aryl, heteroaryl, aldehyde, amino, carboxylic acid, ester, ether, halide, hydroxy, ketone, nitro, cyano, azido, silyl, sulfonyl, sulfinyl, or thiol, as described below.

The symbols $A^n$ is used herein as merely a generic substituent in the definitions below.

The term "aryl" as used herein is a group that contains any carbon-based aromatic group including, but not limited to, benzene, naphthalene, phenyl, biphenyl, phenoxybenzene, aceanthrylene, acenaphthylene, acephenanthrylene, anthracene, azulene, chrysene, fluoranthene, fluorene, as-indacene, s-indacene, indane, indene, phenalene, phenanthrene, pleiadene, pyrene, and triphenylene, and the like.

The term "heteroaryl" is defined as a group that contains an aromatic group that has at least one heteroatom incorporated within the ring of the aromatic group. Examples of heteroatoms include, but are not limited to, nitrogen, oxygen, sulfur, and phosphorus. Examples of heteroaryls include, but are not limited to, azepinyl, acridinyl, benzimidazolyl, benzothiazolyl, benzindolyl, benzodioxolyl, benzofuranyl, benzooxazolyl, benzothiazolyl, benzothiadiazolyl, benzo[b][1,4]dioxepinyl, 1,4-benzodioxanyl, benzonaphthofuranyl, benzoxazolyl, benzodioxolyl, benzodioxinyl, benzopyranyl, benzopyranonyl, benzofuranyl, benzofuranonyl, benzothienyl (benzothiophenyl), benzotriazolyl, benzo[4,6]imidazo[1,2-a]pyridinyl, carbazolyl, cinnolinyl, dibenzofuranyl, dibenzothiophenyl, furanyl, furanonyl, isothiazolyl, imidazolyl, indazolyl, indolyl, indazolyl, isoindolyl, indolinyl, isoindolinyl, isoquinolyl, indolizinyl, isoxazolyl, naphthyridinyl, oxadiazolyl, 2-oxoazepinyl, oxazolyl, oxiranyl, 1-oxidopyridinyl, 1-oxidopyrimidinyl, 1-oxidopyrazinyl, 1-oxidopyridazinyl, 1-phenyl-1H-pyrrolyl, phenazinyl, phenothiazinyl, phenoxazinyl, phthalazinyl, pteridinyl, purinyl, pyrrolyl, pyrazolyl, pyridinyl, pyrazinyl, pyrimidinyl, pyridazinyl, quinazolinyl, quinoxalinyl, quinolinyl, quinuclidinyl, isoquinolinyl, tetrahydroquinolinyl, thiazolyl, thiadiazolyl, triazolyl, tetrazolyl, triazinyl, and thiophenyl (i.e. thienyl). The term "non-heteroaryl," which is included in the term "aryl," defines a group that contains an aromatic group that does not contain a heteroatom. The aryl and heteroaryl group can be substituted or unsubstituted. The aryl and heteroaryl group can be substituted with one or more groups including, but not limited to, alkyl, alkoxy, alkenyl, alkynyl, aryl, heteroaryl, aldehyde, amino, carboxylic acid, ester, ether, halide, hydroxy, ketone, nitro, cyano, azido, silyl, sulfonyl, sulfinyl, or thiol, as described herein. The term "biaryl" is a specific type of aryl group and is included in the definition of aryl. Biaryl refers to two aryl groups that are bound together via a fused ring structure, as in naphthalene, or are attached via one or more carbon-carbon bonds, as in biphenyl.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl" is a cycloalkyl group as defined above where at least one of the carbon atoms of the ring is substituted with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, alkyl, alkoxy, alkenyl, alkynyl, aryl, heteroaryl, aldehyde, amino, carboxylic acid, ester, ether, halide, hydroxy, ketone, nitro, cyano, azido, silyl, sulfonyl, sulfinyl, or thiol, as described herein.

The term "cyclic group" is used herein to refer to either aryl groups, non-aryl groups (i.e., cycloalkyl, heterocycloalkyl, cycloalkenyl, and heterocycloalkenyl groups), or both. Cyclic groups have one or more ring systems that can be substituted or unsubstituted. A cyclic group can contain one or more aryl groups, one or more non-aryl groups, or one or more aryl groups and one or more non-aryl groups.

The terms "amine" or "amino" as used herein are represented by the formula $NA^1A^2A^3$, where $A^1$, $A^2$, and $A^3$ can be, independently, hydrogen, an alkyl, alkenyl, alkynyl, aryl, heteroaryl, cycloalkyl, cycloalkenyl, heterocycloalkyl, or heterocycloalkenyl group described above.

The term "carboxylic acid" as used herein is represented by the formula —C(O)OH.

A "carboxylate" as used herein is represented by the formula —C(O)O$^-$.

The term "ester" as used herein is represented by the formula —OC(O)$A^1$ or —C(O)O$A^1$, where $A^1$ can be an alkyl, alkenyl, alkynyl, aryl, heteroaryl, cycloalkyl, cycloalkenyl, heterocycloalkyl, or heterocycloalkenyl group described above.

The term "hydroxyl" as used herein is represented by the formula —OH.

The term "thiol" as used herein is represented by the formula —SH.

The term "copolymer" is used herein to refer to a macromolecule prepared by polymerizing two or more different monomers. The copolymer can be a random, block, or graft copolymer.

It is to be understood that the compounds provided herein may contain chiral centers. Such chiral centers may be of either the (R-) or (S-) configuration. The compounds provided herein may either be enantiomerically pure or be diastereomeric or enantiomeric mixtures.

As used herein, substantially pure means sufficiently homogeneous to appear free of readily detectable impurities as determined by standard methods of analysis, such as thin layer chromatography (TLC), nuclear magnetic resonance (NMR), gel electrophoresis, high performance liquid chromatography (HPLC) and mass spectrometry (MS), gas-chromatography mass spectrometry (GC-MS), and similar, used by those of skill in the art to assess such purity, or sufficiently pure such that further purification would not detectably alter the physical and chemical properties, such as enzymatic and biological activities, of the substance. Both traditional and modern methods for purification of the compounds to produce substantially chemically pure compounds are known to those of skill in the art. A substantially chemically pure compound may, however, be a mixture of stereoisomers.

Unless stated to the contrary, a formula with chemical bonds shown only as solid lines and not as wedges or dashed lines contemplates each possible isomer, e.g., each enantiomer, diastereomer, and meso compound, and a mixture of isomers, such as a racemic or scalemic mixture.

As used herein, the symbol

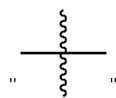

(hereinafter can be referred to as "a point of attachment bond") denotes a bond that is a point of attachment between two chemical entities, one of which is depicted as being attached to the point of attachment bond and the other of which is not depicted as being attached to the point of attachment bond. For example,

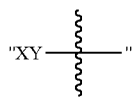

indicates that the chemical entity "XY" is bonded to another chemical entity via the point of attachment bond. Furthermore, the specific point of attachment to the non-depicted chemical entity can be specified by inference. For example, the compound $CH_3—R^3$, wherein $R^3$ is H or

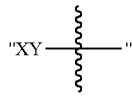

infers that when $R^3$ is "XY", the point of attachment bond is the same bond as the bond by which $R^3$ is depicted as being bonded to $CH_3$.

Reference will now be made in detail to specific aspects of the disclosed materials, compounds, compositions, articles, and methods, examples of which are illustrated in the accompanying Examples and Figures.

Compositions and Methods

The compositions and methods disclosed herein seek to improve the permeabilities and/or selectivities of PBIs by, for example, blending a PBI homo or copolymer with an ortho-functionalized polyimide homo or copolymer and then heat treating the blend to further increase its permeability by taking advantage of a "thermal rearrangement" reaction of ortho-functionalized polyimides.

The polyimides disclosed herein are homo or copolymers comprising polyimides with functional groups ortho to the imide nitrogen (see e.g., 1B and 1C).

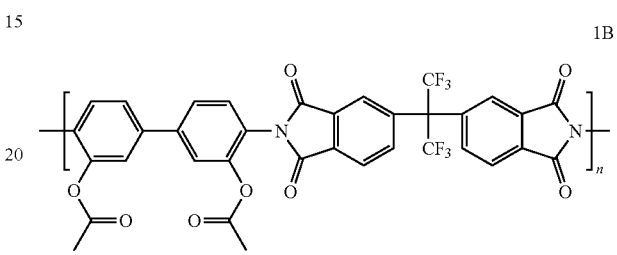

1B

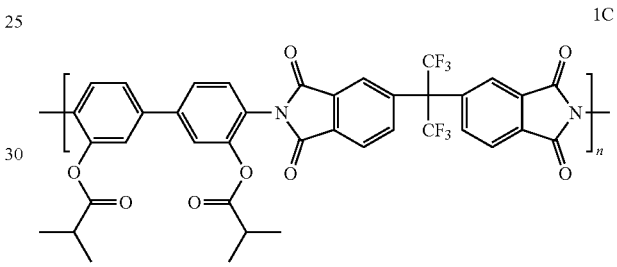

1C

Unlike other polyimides such as the ones employed in prior works on PBI/polyimide blends, the ortho-functionalized polyimides disclosed herein are capable of undergoing a "thermal rearrangement" ("TR") reaction (Sanders, et al., Gas permeability, diffusivity, and free volume of thermally rearranged polymers based on 3,3'-dihydroxy-4,4'-diaminobiphenyl (HAB) and 2,2'-bis-(3,4-dicarboxyphenyl) hexafluoropropane dianhydride (6FDA). *J Membr Sci* 2012, 409-410, 232-241; Park, et al., Polymers with Cavities Tuned for Fast Selective Transport of Small Molecules and Ions. *Science* 2007, 318, 254-258). Thermal rearrangement is where, upon heating, the polyimide loses ortho-positional functional groups to form a heterocyclic structure, such as, but not limited to, polybenzoxazoles, polybenzothiazoles, and/or polybenzimidazoles.

Scheme 1

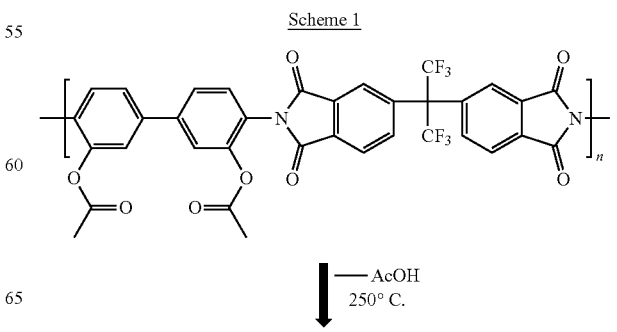

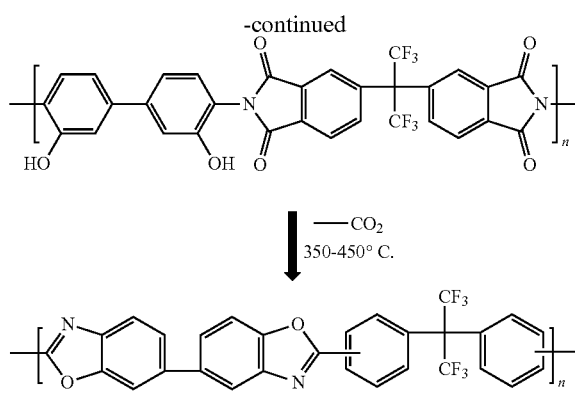

Ortho-functionalized polyimides can contain —OH or —SH groups that rearrange to form benzoxazole or benzothiazole structures (Park, et al., Polymers with Cavities Tuned for Fast Selective Transport of Small Molecules and Ions. *Science* 2007, 318, 254-258). Ortho-functionalized polyimides can also contain —NH$_2$ groups that rearrange to form benzimidazole structures (Han, et al., Highly Gas Permeable and Microporous Polybenzimidazole Membrane by Thermal Rearrangement. *Journal of Membrane Science* 2010, 357, 143-151). Ortho-functionalized polyimides can also contain larger functional groups such as acetate, propanoate, and pivalate groups that can be thermally removed to form, for example, an ortho-hydroxyl-functionalized polyimide that can undergo further thermal rearrangement to form, for example, a polybenzoxazole (Smith, et al., Effect of Polymer Structure on Gas Transport Properties of Selected Aromatic Polyimides, Polyamides and TR Polymers. *J Membr Sci* 2015, 493, 766, 781). For HAB-6FDA-CI (1B) which possesses an ortho-acetate functional group, heating the polymer to around 250° C. results in the loss of acetic acid to form an ortho-hydroxyl-functionalized polyimide (Scheme 1). Further heat treatment to 350-450° C. results in the loss of carbon dioxide and ring closing to form an insoluble polybenzoxazole. Ortho-functionalized polyimides containing functional groups also present in polymers of intrinsic microporosity (PIMs) have also been shown to undergo thermal rearrangement (Shamsipur, et al., Thermally Rearrangeable PIM-Polyimides for Gas Separation Membranes. *Macromolecules* 2014, 47, 5595-5606). Further examples of ortho-functionalized polyimides that can undergo thermal rearrangement, and are suitable for use herein, are found in U.S. Pat. No. 8,561,812. Ortho-functionalized polyimides could also contain functional groups present in other polyimides, for example, benzophenone groups such as those in the BTDA monomer used to synthesize XU 218 (Guerra, et al., Fourier Transform Infrared Spectroscopy of Some Miscible Polybenzimidazole/Polyimide Blends. *Macromolecules* 1988, 21, 231-234). The references disclosed herein are incorporated by reference in their entireties for their teachings of ortho-functionalized polyimides.

Many polybenzoxazoles and other heterocyclic structures formed by thermal rearrangement have limited solubility in organic solvents which results in processing challenges, but one advantage of this process is that the ortho-functionalized polyimide is much more soluble and can be processed into useful membrane geometries then heat treated to form the more desirable heterocyclic structure, for example, polybenzoxazole. An additional advantage of these polyimides is the introduction of additional free volume into the polymer when the small molecules are removed from the decomposing functional group. Gas permeabilities are sensitively dependent on free volume, so this thermal rearrangement can lead to an order of magnitude increase in gas permeability. Further studies have demonstrated that thermal rearrangement of polyimides containing larger ortho-functional groups such as propanoate and pivalate groups result in greater increases in free volume and gas permeability than those containing acetate groups, which in turn result in greater increases in free volume and gas permeability than hydroxyl-functionalized polyimides (Sanders, et al., Influence of polyimide precursor synthesis route and ortho-position functional group on thermally rearranged (TR) polymer properties: Conversion and free volume. *Polymer* 2014, 55, 1636-1647; Sanders, et al., Energy-efficient polymeric gas separation membranes for a sustainable future: A review. *Polymer* 2013, 54, 4729-4761). In these studies, this increase in gas permeability was also accompanied by a decrease in gas selectivity. However, if these polyimides are incorporated into a continuous PBI matrix and thermally rearranged, the resulting heat-treated blend can maintain high selectivities while also showing improved permeabilities from free volume afforded by the rearrangement.

Thermally Rearrangable Capable Polyimides

In the disclosed polymer blends, the polyimide component that is used is an ortho-functionalized polyimide homo or copolymer that is able to undergo thermal rearrangement to a polymer comprising a phenylene heterocyclic group, such as, but not limited to, polybenzoxazole, polybenzothiazole, polybenzimidazole, and/or other heterocyclic upon heating. The resulting polymer blend is referred to herein as a "thermally rearranged polymer blend." The disclosed ortho-functionalized polyimide homo or copolymer can have a domain represented by Formula I

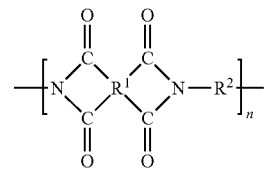

I wherein
n is from 2 to 100,000;
R$^1$ is or is a moiety that comprises,

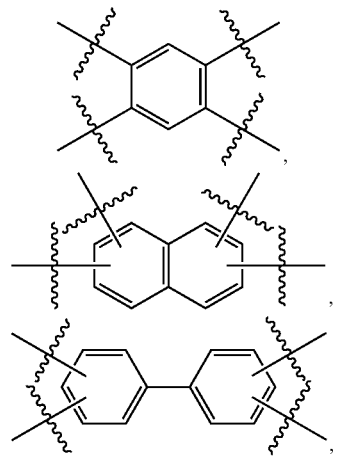

-continued

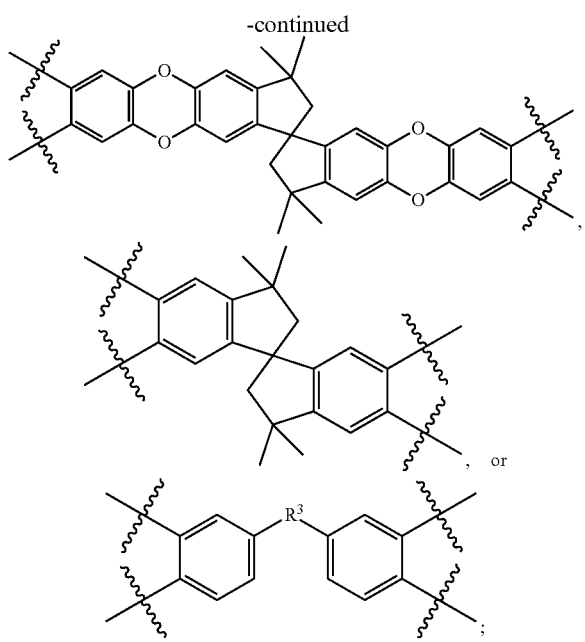, or

;

$R^2$ is or is a moiety that comprises

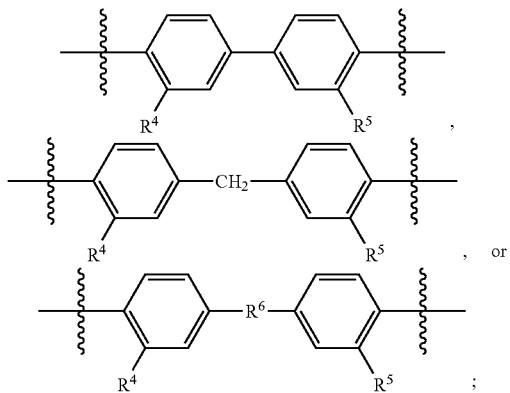, or

;

$R^3$ is chosen from —O—, —S—, —C(O)—, —S(O)—, —S(O)$_2$—, —CH$_2$—, —C(CH$_3$)$_2$—, —C(CF$_3$)$_2$—,

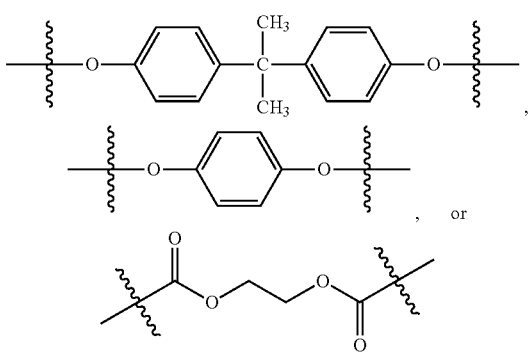

, or

, $R^4$ and $R^5$ are each independently chosen from —OH, —SH, —OC(O)C$_1$-C$_6$ alkyl, —OC(O)C$_1$-C$_6$ haloalkyl, —OC(O)C$_1$-C$_6$ cycloalkyl, or —NH$_2$; and $R^6$ is chosen from —O—, —S—, —C(O)—, —S(O)—, —S(O)$_2$—, —CH$_2$—, —C(CH$_3$)$_2$—, or —C(CF$_3$)$_2$—.

In some specific examples, $R^4$ and $R^5$ are each independently chosen from

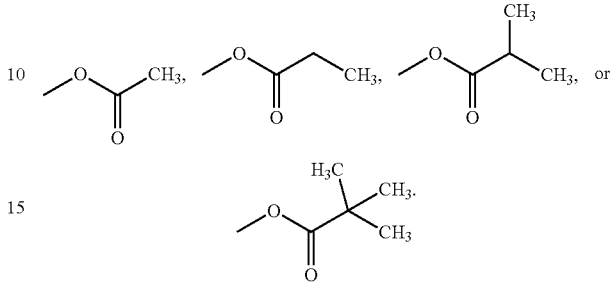

Some specific examples of suitable thermally rearrangable ortho-functionalized polyimides that can be used herein are shown below.

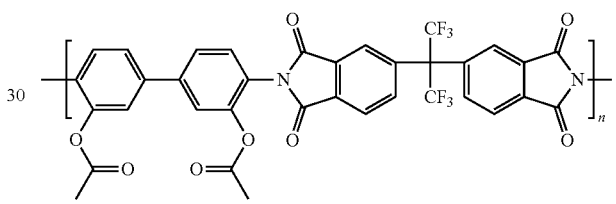

1B

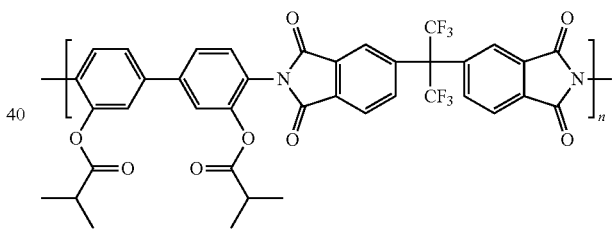

1C

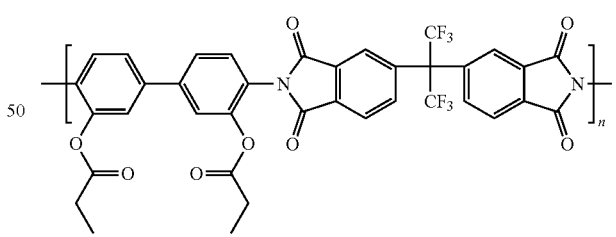

1D

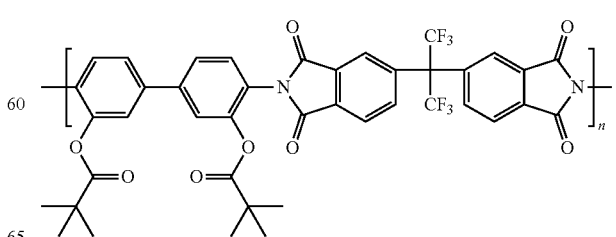

1E

-continued

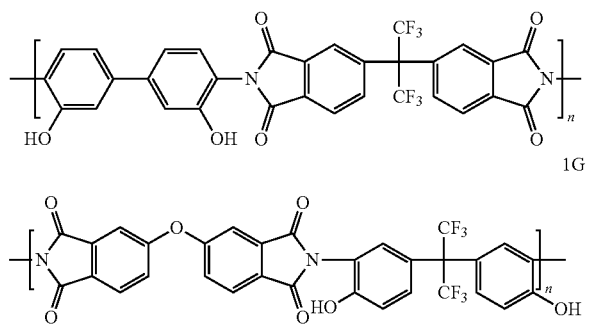

where n is an integer from 2 to 100,000.

The disclosed ortho-functionalized polyimides can be homopolymers of the polyimides disclosed herein (e.g., those of Formula I, including specific compounds 1B-1G). In other examples, the disclosed ortho-functionalized polyimides can be copolymers of the polyimides disclosed herein with another polymer. Examples of other polymers that can be combined with the disclosed polyimides include polyethylene, polypropylene, polyvinylchloride, polyvinylidene fluoride, polybutylene terephthalate, polymethylmethacrylate (PMMA), polyurethane, poly(ethylene oxide), poly(propylene oxide), polycarbonates, polysulfones, polyethersulfones, sulfonated polyethersulfones, polyetherimides, polyimides, polyvinylpyrrolidones, polyetherimides, cellulosic polymers, polyamides, polyamide/imides, polyketones, polyether ketones, poly(vinyl amides), poly(benzimidazole), polyhydrazides, polyoxadiazoles, polytriazoles, polycarbodiimides, polyphosphazines, polymers of intrinsic microporosity, and the like.

Molecular weight of the disclosed polyimides can be 2,000 g/mol or more (e.g., 4,000 g/mol or more; 6,000 g/mol or more; 8,000 g/mol or more; 10,000 g/mol or more; 12,000 g/mol or more; 14,000 g/mol or more; 16,000 g/mol or more; 18,000 g/mol or more, 20,000 g/mol or more; 25,000 g/mol or more, 30,000 g/mol or more, 50,000 g/mol or more; 100,000 g/mol or more; 150,000 g/mol or more; 200,000 g/mol or more; 250,000 g/mol or more; 500,000 g/mol or more; 1,000,000 g/mol or more; 1,500,000 g/mol or more; or 2,000,000 g/mol or more).

In some examples, the disclosed polyimides can have a molecular weight of 2,000,000 g/mol or less (e.g., 1,500,000 g/mol or less; 1,000,000 g/mol or less; 500,000 g/mol or less; 250,000 g/mol or less; 200,000 g/mol or less; 150,000 g/mol or less; 100,000 g/mol or less; 50,000 g/mol or less; 30,000 g/mol or less, 25,000 g/mol or less, 20,000 g/mol or less; 18,000 g/mol or less; 16,000 g/mol or less; 14,000 g/mol or less; 12,000 g/mol or less; 10,000 g/mol or less; 8,000 g/mol or less; 6,000 g/mol or less; 4,000 g/mol or less; or 2,000 g/mol or less).

The molecular weight of the disclosed polyimides can range from any of the minimum values described above to any of the maximum values described above. For example, the molecular weight of the copolymer can be from 2,000 g/mol to 2,000,000 g/mol (e.g., from 2,000 g/mol to 1,500,000 g/mol; from 10,000 g/mol to 1,000,000 g/mol; from 20,000 g/mol to 500,000 g/mol; from 50,000 g/mol to 250,000 g/mol; from 100,000 g/mol to 2,000,000 g/mol; from 5,000 g/mol to 18,000 g/mol; from 12,000 g/mol to 50,000 g/mol; from 2,000 g/mol to 50,000 g/mol, from 2,000 g/mol to 25,000 g/mol, from 2,000 g/mol to 20,000 g/mol, from 5,000 g/mol to 20,000 g/mol, from 5,000 g/mol to 15,000 g/mol, or from 10,000 g/mol to 20,000 g/mol).

PBI

In the disclosed polymer blends, the polybenzimidazole component can be a homo or copolymer having a domain represented by Formula II

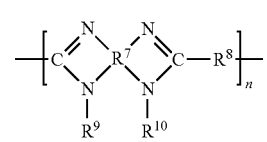

wherein n is from 2 to 100,000;

$R^7$ is or is a moiety that comprises

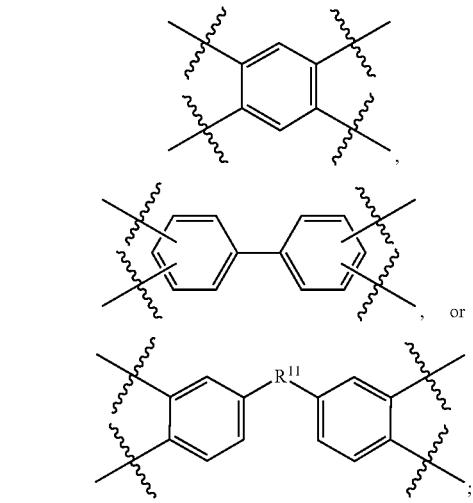

$R^8$ is or is a moiety that comprises —$(CH_2)_{1-8}$—,

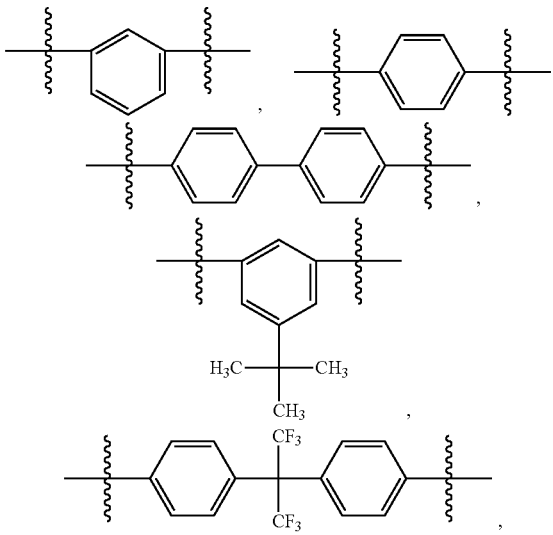

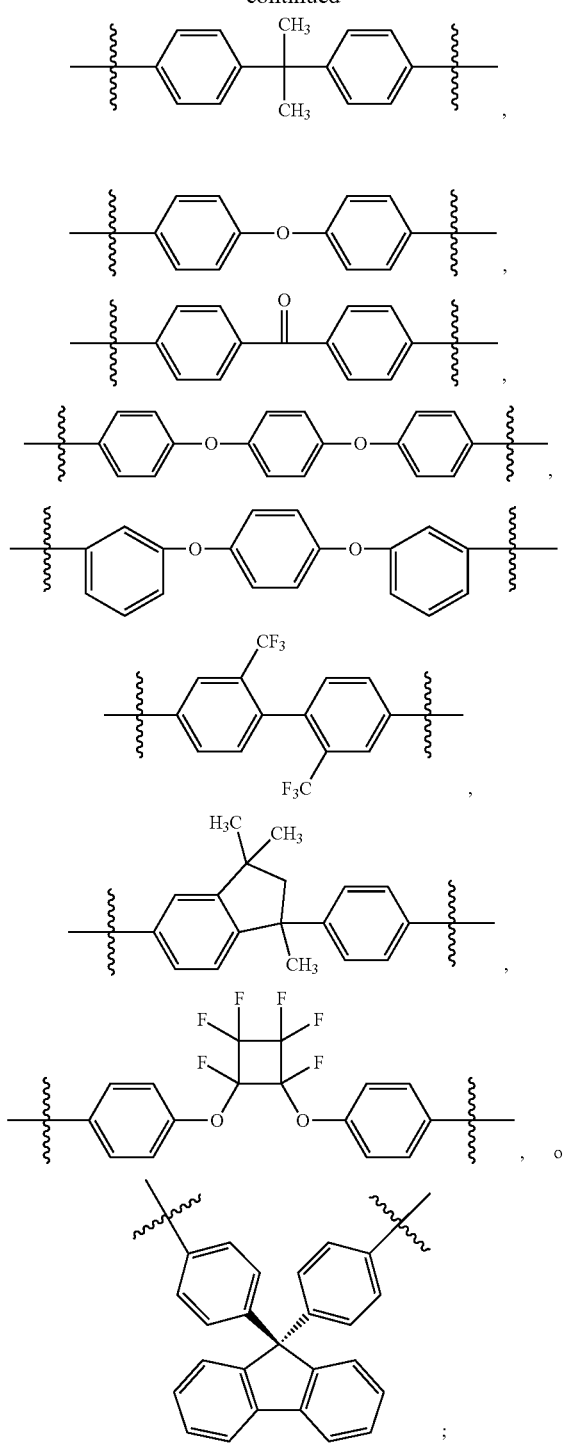

R₉ and R₁₀ are independently chosen from H, C₁-C₃ alkyl, —CH₂Si(CH₃)₃, or

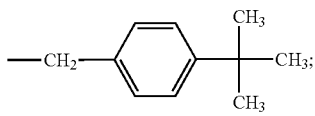

and
R¹¹ is —O—, —S(O)₂—, or

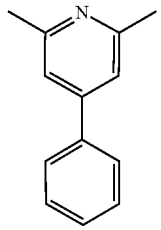

In specific examples, the polybenzimidazole component can be any commercially available polybenzimidazole, e.g., CELAZOLE™

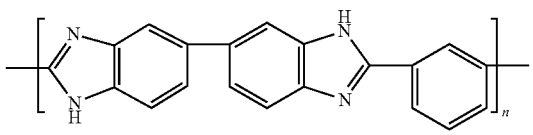

wherein n is an integer from 2 to 100,000.

The disclosed polybenzimidazoles can be homopolymers of the polybenzimidazole disclosed herein (e.g., those of Formula II). In other examples, the disclosed polybenzimidazole can be copolymers of the polybenzimidazoles disclosed herein with another polymer. Examples of other polymers that can be combined with the disclosed polyimides include polyethylene, polypropylene, polyvinylchloride, polyvinylidene fluoride, polybutylene terephthalate, polymethylmethacrylate (PMMA), polyurethane, poly(ethylene oxide), poly(propylene oxide), polycarbonates, polysulfones, polyethersulfones, sulfonated polyethersulfones, polyetherimides, polyimides, polyvinylpyrrolidones, polyetherimides, cellulosic polymers, polyamides, polyamide/imides, polyketones, polyether ketones, poly(vinyl amides), poly(benzimidazole), polyhydrazides, polyoxadiazoles, polytriazoles, polycarbodiimides, polyphosphazines, polymers of intrinsic microporosity, and the like.

Molecular weight of the disclosed polybenzimidazoles can be 2,000 g/mol or more (e.g., 4,000 g/mol or more; 6,000 g/mol or more; 8,000 g/mol or more; 10,000 g/mol or more; 12,000 g/mol or more; 14,000 g/mol or more; 16,000 g/mol or more; 18,000 g/mol or more, 20,000 g/mol or more; 25,000 g/mol or more, 30,000 g/mol or more, 50,000 g/mol or more; 100,000 g/mol or more; 150,000 g/mol or more; 200,000 g/mol or more; 250,000 g/mol or more; 500,000 g/mol or more; 1,000,000 g/mol or more; 1,500,000 g/mol or more; or 2,000,000 g/mol or more).

In some examples, the disclosed polybenzimidazoles can have a molecular weight of 2,000,000 g/mol or less (e.g., 1,500,000 g/mol or less; 1,000,000 g/mol or less; 500,000 g/mol or less; 250,000 g/mol or less; 200,000 g/mol or less; 150,000 g/mol or less; 100,000 g/mol or less; 50,000 g/mol or less; 30,000 g/mol or less, 25,000 g/mol or less, 20,000 g/mol or less; 18,000 g/mol or less; 16,000 g/mol or less; 14,000 g/mol or less; 12,000 g/mol or less; 10,000 g/mol or less; 8,000 g/mol or less; 6,000 g/mol or less; 4,000 g/mol or less; or 2,000 g/mol or less).

The molecular weight of the disclosed polybenzimidazoles can range from any of the minimum values described above to any of the maximum values described above. For example, the molecular weight of the copolymer can be from 2,000 g/mol to 2,000,000 g/mol (e.g., from 2,000 g/mol to 1,500,000 g/mol; from 10,000 g/mol to 1,000,000 g/mol; from 20,000 g/mol to 500,000 g/mol; from 50,000 g/mol to 250,000 g/mol; from 100,000 g/mol to 2,000,000 g/mol; from 5,000 g/mol to 18,000 g/mol; from 12,000 g/mol to 50,000 g/mol; from 2,000 g/mol to 50,000 g/mol, from 2,000 g/mol to 25,000 g/mol, from 2,000 g/mol to 20,000 g/mol, from 5,000 g/mol to 20,000 g/mol, from 5,000 g/mol to 15,000 g/mol, or from 10,000 g/mol to 20,000 g/mol).

Polymer Blends

Disclosed herein are blends of two or more polymers. By polymer blend is meant a composition comprising one or more ortho-functionalized polyimide homo or copolymer and one or more polybenzimidazole homo or copolymer. Reference to the polymer blend is meant to include the composition before thermal rearrangement of the one or more ortho-functionalized polyimide homo or copolymer, thus a blend of the one or more ortho-functionalized polyimide homo or copolymer and polybenzimidazole homo or copolymer, as well as the composition after thermal rearrangement of the one or more ortho-functionalized polyimide homo or copolymer, thus a blend of the thermally rearranged product, which can be a polymer comprising a phenylene heterocyclic group, such as, but not limited to, polybenzoxazole, polybenzothiazole, polybenzimidazole, and/or other heterocyclic structure from the ortho-functionalized polyimide, and the polybenzimidazole homo or copolymer.

In specific examples, the disclosed polymer blends can comprise one or more ortho-functionalized polyimide homo and one or more polybenzimidazole homo; one or more ortho-functionalized polyimide homo and one or more polybenzimidazole copolymer; one or more ortho-functionalized polyimide copolymer and one or more polybenzimidazole homo; or one or more ortho-functionalized polyimide copolymer and one or more polybenzimidazole copolymer.

In specific examples, the disclosed polymer blends can be immiscible blends, and thus there is a continuous phase and a dispersed phase. The continuous phase can comprises the polybenzimidazole homo or copolymer, and the dispersed phase comprises the ortho-functionalized polyimide homo or copolymer or the thermally rearranged product thereof, i.e., a phenylene heterocyclic group, such as, but not limited to, polybenzoxazole, polybenzothiazole, polybenzimidazole, and/or other heterocyclic structure. In other examples, the continuous phase can comprise the ortho-functionalized polyimide homo or copolymer and the dispersed phase comprises the polybenzimidazole homo or copolymer. In other specific examples, the disclosed polymer blends can be homogenous, miscible blends of the ortho-functionalized polyimide homo or copolymer and the polybenzimidazole homo or copolymer. It can be preferred for the polybenzimidazole homo or copolymer to be in the continuous phase and the ortho-functionalized polyimide homo or copolymer to be in the dispersed phase.

The disclosed polymer blends can comprise from 1-99 wt % of the ortho-functionalized polyimide and from 99-1 wt % of the polybenzimidazole, before heating and thermal rearrangement. The disclosed polymer blends can also comprise from 1-99 wt % of the thermally rearranged ortho-functionalized polyimides and from 99-1 wt % of the polybenzimidazole. In specific examples, the disclosed polymer blends can comprise from 5-45 wt % of the ortho-functionalized polyimide and from 95-65 wt % of the polybenzimidazole, before heating and thermal rearrangement. In specific examples, the disclosed polymer blends can comprise from 5-45 wt % of the thermally rearranged ortho-functionalized polyimide and from 95-65 wt % of the polybenzimidazole. In some examples, it can be preferable to have the polymer blend comprise from 5-45 wt % of the ortho-functionalized polyimide, or the thermally rearranged product thereof, i.e., a phenylene heterocyclic group, such as, but not limited to, polybenzoxazole, polybenzothiazole, polybenzimidazole, and/or other heterocyclic structure, and from 95-65 wt % of the polybenzimidazole.

In specific examples, the amount of ortho-functionalized polyimide homo or copolymer in the blend can be 5 wt % or more (e.g., 10 wt %, 15 wt % or more, 20 wt % or more, 25 wt % or more, 30 wt % or more, 35 wt % or more, 40 wt % or more, 45 wt % or more, 50% or more, 55 wt % or more, 65 wt % or more, 70 wt % or more, 75 wt % or more, 80 wt % or more, 85 wt % or more, 90 wt % or more, or 95 wt %) before heating and thermal rearrangement. In some examples, the amount of ortho-functionalized polyimide homo or copolymer in the blend can be less than 95 wt % (e.g., 90 wt % or less, 85 wt % or less, 80 wt % or less, 75 wt % or less, 70 wt % or less, 65 wt %, 60 wt % or less, 55 wt % or less, 45 wt % or less, 40 wt % or less, 35 wt % or less, 30 wt % or less, 25 wt % or less, 20 wt % or less, 15 wt % or less, 10 wt % or less, or 5 wt %) before heating and thermal rearrangement. The amount of ortho-functionalized polyimide homo or copolymer in the blend can, in certain examples, range from any of the minimum values described above to any of the maximum values described above. It is generally preferred, however, to keep the ortho-functionalized polyimide content at 50 wt % or below. While most of the blends disclosed herein are mechanically robust, at high polyimide contents, the resulting membrane can be brittle or less mechanically robust.

In other examples, the amount of polybenzimidazole homo or copolymer in the blend can be 5 wt % or more (e.g., 10 wt %, 15 wt % or more, 20 wt % or more, 25 wt % or more, 30 wt % or more, 35 wt % or more, 40 wt % or more, 45 wt % or more, 50% or more, 55 wt % or more, 65 wt % or more, 70 wt % or more, 75 wt % or more, 80 wt % or more, 85 wt % or more, 90 wt % or more, or 95 wt %) before heating and thermal rearrangement. In further examples, the amount of polybenzimidazole homo or copolymer in the blend can be 95 wt % or less (e.g., 90 wt % or less, 85 wt % or less, 80 wt % or less, 75 wt % or less, 70 wt % or less, 65 wt %, 60 wt % or less, 55 wt % or less, 45 wt % or less, 40 wt % or less, 35 wt % or less, 30 wt % or less, 25 wt % or less, 20 wt % or less, 15 wt % or less, 10 wt % or less, or 5 wt %) before heating and thermal rearrangement. The amount of polybenzimidazole homo or copolymer in the blend can in certain examples, range from any of the minimum values described above to any of the maximum values described above.

In specific examples, the ortho-functionalized polyimide homo or copolymer and polybenzimidazole homo or copolymer in the disclosed blends can be in a weight ratio of 20:80, 33:67, 40:60, 50:50, 67:33, or 80:20.

The disclosed polymer blends can have either a nonporous or porous symmetric structure, an asymmetric structure having a thin nonporous or porous selective layer supported on top of a porous support layer with both layers made from the blend polymers, or an asymmetric structure having a thin nonporous or porous selective layer made from the polymer blends supported on top of a porous support layer made from a different polymer material or an inorganic material. The polymer blends can be fabricated into any convenient geometry such as flat sheet (or spiral wound), disk, tube, hollow fiber, or thin film composite.

Compatibilizers

In some polymer blends disclosed herein, the polymer components may phase separate. For example, in some examples it has been found that at higher amounts of polybenzimidazoles (e.g., greater than 50 wt % or more), phase separation occurs. Phase compatibilizing agents can be added to the polymer blends to decrease the size and increase the surface area of the dispersed phase. Thus, the disclosed polymer blends can also comprise a phase compatibilizing agent or compatibilizer that can be either an organic or an inorganic material. In general, the compatibilizer can be any material that can chemically interact with both a polybenzimidazole and ortho-functionalized polyimide. In particular examples, a compatibilizer can interact with both a polybenzimidazole and ortho-functional polyimide through van der Waals interactions, hydrogen bonding, dipole-dipole interactions, electron donor-acceptor complex formation, ion-dipole interactions, and ion-ion interactions (Koning, et al., Strategies for Compatibilization of Polymer Blends. *Progress in Polymer Science* 1998, 23, 707-757). Imidazoles, for example, have been shown to be effective compatibilizers for polybenzimidazoles and polyimides (Panapitiya, et al., Gas Separation Membranes Derived from High-Performance Immiscible Polymer Blends Compatibilized with Small Molecules. *ACS Applied Materials & Interfaces* 2015, 7, 18618-18627), and a variety of structural variations are available for imidazoles (Hindman, et al., Synthesis of 1,2-Dialkyl-, 1,4(5)-Dialkyl-, and 1,2,4(5)-Trialkylimidazoles via a One-Pot Method. *Industrial & Engineering Chemistry Research* 2013, 52, 11880-11887). It has been hypothesized that imidazoles such as 2-methylimidazole can form π-π and/or hydrophobic interactions with polybenzimidazoles and hydrogen bonds with polyimides (Panapitiya, et al., Gas Separation Membranes Derived from High-Performance Immiscible Polymer Blends Compatibilized with Small Molecules. *ACS Applied Materials & Interfaces* 2015, 7, 18618-18627), so it is expected that a variety of other small organic or inorganic molecules that can undergo specific interactions with polybenzimidazoles and ortho-functionalized polyimides can also be used as compatibilizing agents.

Examples of suitable organic compatibilizers include those of Formula III

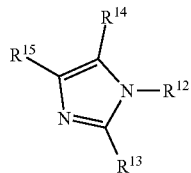

III wherein $R^{12}$, $R^{13}$, $R^{14}$, and $R^{15}$ are independently chosen from $C_1$-$C_6$ alkyl, aryl, or arylalkyl.

In specific examples, the organic compatibilizer is chosen from 1-methylimidazole, 2-methylimidazole, 1-ethylimidazole, 2-ethylimidazole, 1-propylimidazole, 2-propylimidazole, 1-butylimidazole, 2-butylimidazole, 1-phenylimidazole, 2-phenylimidazole, 1-benzylimidazole, or 2-benzylimidazole.

Additional examples of organic compounds that can be used as compatibilizers due to their potential ability to provide hydrogen bonding sites and/or pi-bond interactions with polybenzimidazoles and/or ortho-functionalized polyimides are pyrrolines, pyrroles, pyrazolidines, imidazolidines, pyrazolines, pyrazoles, imidazolines, triazoles, tetrazoles, furans, dioxolanes, thiophenes, oxazoles, isoxazoles, isothiazoles, thiazoles, oxathiolanes, oxadiazoles, thiadiazoles, pyridines, piperazines, pyridazines, pyrimidines, pyrazines, triazines, pyrans, pyryliums, dioxanes, dioxines, thiopyrans, dithianes, trithianes, morpholines, oxazines, thiomorpholines, thiazines, indoles, isoindoles, indolizines, indazoles, benzimidazoles, azaindoles, azaindazoles, purines, benzofurans, isobenzofurans, benzothiophenes, benzoisoxazoles, benzoisothiazoles, benxoxazoles, benzothiazoles, benzothiadiazoles, adenines, guanines, hydroquinolines, quinolones, isoquinolines, quinolizines, quinoxalines, phthalazines, quinazolines, cinnolines, naphthyridines, pyridopyrimidines, pyridopyrazines, pteridines, chromenes, isochromenes, chromenones, benzoxazines, quinolinones, isoquinolinones, carbazoles, dibenzofurans, acridines, phenazines, phenoxazines, phenothiazines, phenoxathiines, azepines, diazepines, dihydroazepines, thiepines, thiazepines, azocines, azecines, and imidazolium-based ionic liquids.

Examples of suitable inorganic compatibilizers include lithium chloride, lithium bromide, sodium chloride, sodium bromide, potassium chloride, potassium bromide, calcium chloride, calcium bromide, copper chloride, metal organic frameworks, and zeolitic imidazolate frameworks including ZIF-7, ZIF-8, and ZIF-90.

The compatibilizer can be added to the disclosed polymer blends at an amount of up to 99 wt %, e.g., from 0.5, 5, 110, 15, 20, 25, 30, 35, 40, 45, 50, 55, 60, 65, 70, 75, 80, 85, 90, 95 or 99 wt %, where any of the stated values can form an upper or lower endpoint of a range. In specific examples, the compatibilizer can be added to the disclosed polymer blends at an amount of from 0.5 to 25 wt %, more specifically 0.5 to 15 wt %, and most preferably from 5 to 15 wt %.

Methods of Making

The disclosed polymer blends can be prepared by blending the ortho-functionalized polyimide and polybenzimidazole, and optional compatibilizer. Blends can be accomplished by dissolving the polymers together in a solvent or by dissolving each polymer in a separate solvent and then combining the solutions. Sonication can be used to improve mixing and dispersion of the components in solution. The polymer blends can be fabricated into a nonporous symmetric thin film geometry by casting a polymer solution comprising the ortho-functionalized polyimide and polybenzimidazole and optional compatibilizer on top of a clean glass plate and allowing the solvent to evaporate slowly (e.g., for at least 12 hours at room temperature). The membrane can then be detached from the glass plate and dried at room temperature for from 8 to 24 hours and then at 50-200° C. for 4 to 6 hours under vacuum. The films can optionally be boiled in water and then dried at 150° C. for 24 hours under full vacuum.

The solvents used for dissolving the ortho-functionalized polyimides and polybenzimidazoles are chosen primarily for their ability to completely dissolve the polymers and for ease of solvent removal in the membrane formation steps. Other considerations in the selection of solvents include low toxicity, low corrosive activity, low environmental hazard potential, availability, and cost. Representative solvents for use herein include most amide solvents that are typically used for the formation of polymeric membranes, such as N-methylpyrrolidone (NMP) and N,N-dimethyl acetamide (DMAc), methylene chloride, tetrahydrofuran (THF), acetone, N,N-dimethylformamide (DMF), dimethyl sulfoxide (DMSO), toluene, dioxanes, 1,3-dioxolane, acetonitirile, chloroform, trichloroethylene, sulfuric acid, formic acid, methanesulfonic acid, trifluoroacetic acid, and mixtures thereof. In a specific example, the solvent is DMAc.

The disclosed polymer blends can also be fabricated by a method comprising the steps of: dissolving the ortho-functionalized polyimide and the polybenzimidazole in a solvent to form a polymer solution; contacting a support (e.g., a support made from inorganic ceramic material) with the polymer solution; and evaporating the solvent to provide a thin layer comprising the ortho-functionalized polyimide and polybenzimidazole on the support.

The disclosed polymer blend can also be fabricated as an asymmetric membrane with flat sheet or hollow fiber geometry by phase inversion followed by direct air drying through the use of at least one drying agent which is a hydrophobic organic compound such as a hydrocarbon or an ether. The disclosed polymer blend can also be fabricated as an asymmetric membrane with flat sheet or hollow fiber geometry by phase inversion followed by solvent exchange methods.

The blends can also be dried under vacuum at elevated temperatures (e.g., 200° C. for 24 hrs).

The support can be a metal support, glass, quartz, ceramic, or plastic support. The blend can be removed from the support after drying or after heat treatment.

The polymer blend can then be heat treated by heating to a temperature where the ortho-functionalized polyimide component in the polymer blend undergoes a thermal rearrangement to form a heterocyclic reaction product, for example, polybenzoxazole, polybenzothiazole, and/or polybenzimidazole. The resulting polymer blend is a thermally rearranged polymer blend. The rate of heating can be from 1 to 50° C./min, e.g., 15, 10, 5, or 1° C./min. It can be preferred to heat at a rate of from 1 to 10° C./min. While the particular temperature where thermal rearrangement occurs can vary depending on concentration, pressure, the specific polymers, and the like, generally the blend is heated to from 200 to 450° C. Heating can also involve a stepwise heating gradient where the blend is heated to one temperature and held for a period of time and then heated to a higher temperature and held again. Heating can be performed under environments including but not limited to vacuum, inert atmosphere (e.g., $N_2$), or air.

Methods of Use

The disclosed thermally rearranged polymer blend membranes can be used for the separation of hydrogen from carbon dioxide in applications such as pre-combustion carbon capture at integrated gasification combined cycle facilities. Hydrogen and carbon dioxide are produced through gasification of coal followed by a water-gas shift reaction. This process stream could contain upwards of 40% $CO_2$ that would need to be separated so the hydrogen could be used as a chemical feedstock or as fuel. A membrane that can operate at elevated temperatures is ideal for this separation as an economic alternative to absorption processes.

It has been found and is disclosed herein that blending an ortho-functional polyimide with a polybenzimidazole in solution, casting a film from the solution, and allowing the ortho-functionalized polyimide to undergo thermal rearrangement to form a thermally rearranged polymer blend results in exceptional gas separation properties. For example, two HAB-6FDA fluorinated polyimides which undergo the thermal rearrangement process, containing either acetate ("CI") or isobutyrate ("PA") functionalities, were solution blended with commercial PBI, CELAZOLE™, at concentrations of 20 to 40 wt % polyimide. Films were cast of these mixtures using dimethylacetamide solvent, and solvent was evaporated. The blend films were heated under nitrogen for 1 hour at 300° C. followed by 1 hour at 400° C. following a previously reported procedure for thermal rearrangement. Some films were also cast using a solution that contained 9 wt % of 1-methylimidazole as a phase compatibilizer and treated using the same process. The resulting thermally rearranged polymer blend films from both batches showed improved gas permeabilities with respect to CELAZOLE™ at 35° C., with up to a 4-fold improvement, and in some cases, an improvement of up to 54% in $H_2/CO_2$ selectivity as well. These compositions exceeded the 2008 Robeson upper bound for $H_2/CO_2$ separations, which represents the current state-of-the-art performance for polymer membranes and represents an inherent limitation in polymer membrane separation performance that is difficult to overcome. The resulting thermally rearranged polymer blend films are also thermally stable at temperatures exceeding 400° C., which indicates they can be useful for high temperature gas separations. In previous studies, as polyimide precursors to thermal rearrangement polymers underwent the thermal rearrangement process, permeability increased substantially, often at the expense of selectivity. For example, when HAB-6FDA-CI undergoes the thermal rearrangement process described above, there is a significant increase in permeability and decrease in selectivity. Remarkably, however, after thermal rearrangement of some ortho-functional polyimide containing blends, both permeabilities and selectivities increased significantly, which is unexpected. For example, the thermally rearranged polymer blend with 33% HAB-6FDA-CI had 2.4× higher $H_2$ permeability than CELAZOLE™ and over 50% higher $H_2/CO_2$ selectivity (42 vs. 27).

The use of compatibilizing agents such as 1-methylimidazole can also be useful to tune the morphology of these blends to provide optimum mechanical properties and gas separation performance. For example, in blends containing 33-67 wt % HAB-6FDA-CI with the remaining composition being CELAZOLE™ and no 1-methylimidazole, macroscopic phase separation was observed (FIGS. 1A-1D). This resulted, for example, in a low $H_2/CO_2$ selectivity of 3.0 after thermal rearrangement for the 40 wt % HAB-6FDA-CI blend when dried at 35° C. before testing gas flux. With 1-methylimidazole, however, blends containing similar compositions of HAB-6FDA-CI and CELAZOLE™ did not show macroscopic phase separation (FIGS. 2A-2D). This resulted, for example, in a much higher $H_2/CO_2$ selectivity of 16.5 after thermal rearrangement for the blend containing 9.1 wt % 1-methylimidazole, 36.4 wt % HAB-6FDA-CI, and 54.5 wt % CELAZOLE™. This thermally rearranged blend also showed a $H_2$ permeability of 10.2 Barrer when dried at 35° C. before testing gas flux that was over 4 times the permeability previously measured for pure CELAZOLE™ (2.4 Barrer). Blends of CELAZOLE™ with 6FDA-DAM:DABA polyimide with up to 9 wt % 2-methylimidazole additive have previously been demonstrated to have improved $H_2$ permeabilities and $H_2/CO_2$ selectivities relative to CELAZOLE™ (Panapitiya, et al., Gas Separation Membranes Derived from High-Performance Immiscible Polymer Blends Compatibilized with Small Molecules. *ACS Applied Materials & Interfaces* 2015, 7, 18618-18627). That work, however, did not consider thermal treatment of the blends, which in the present disclosure has been found to further increase the permeabilities and/or selectivities of the materials.

The disclosed thermally rearranged polymer blends are also useful in gas separation processes in air purification, petrochemical, refinery, and natural gas industries. Examples of such separations include separation of volatile organic compounds (such as toluene, xylene, and acetone)

from an atmospheric gas, such as oxygen or nitrogen, and oxygen or nitrogen recovery from air. Further examples of such separations are for the separation of $CO_2$ or $H_2S$ from natural gas, $H_2$ from $N_2$, $H_2$ from $CO_2$, $CH_4$, and Ar in ammonia purge gas streams, $H_2$ recovery in refineries, olefin/paraffin separations such as ethylene/ethane or propylene/propane separations, iso/normal paraffin separations, and dehydration. Any given pair or group of gases that differ in molecular size, for example hydrogen and carbon dioxide, nitrogen and oxygen, carbon dioxide and methane, hydrogen and methane or carbon monoxide, helium and methane, can be separated using the disclosed thermally rearranged polymer blends.

Still further, the disclosed thermally rearranged polymer blends can be used to separate a target gas from a gas stream by contacting polymer blend with the gas stream. The target gas can selectively permeate the thermally rearranged polymer blend and thereby be separated from the gas stream. This general method can be applied to multiple types of gas separations. For example, the disclosed method can be used to separate $H_2$ from ethane, $H_2$ from ethylene, $H_2$ from propane, $H_2$ from propylene, ethylene from ethane, propylene from propane, $O_2$ from $N_2$, $O_2$ from air, $N_2$ from air, $CO_2$ from $N_2$, $CO_2$ from $CH_4$, $H_2$ from $CH_4$, He from $CH_4$, $H_2$ from $N_2$, $N_2$ from CO (syngas ratio adjustment), $H_2S$ from natural gas, volatile organic compounds (toluene, xylene, acetone, etc.) from atmospheric gas, $H_2$ from Ar, iso paraffin from normal paraffin, ethanol from water, benzene and toluene from aliphatic hydrocarbons, $N_2$ from propane, $N_2$ from propylene, methane from n-butane, $H_2$ from n-butane, and the like. The disclosed thermally rearranged polymer blends can also be used for separating $H_2$, $CH_4$, $C_2H_4$, $C_2H_6$, $C_3H_6$, and $C_3H_8$ from catalytic dehydrogenation reactions. The disclosed thermally rearranged polymer blends can also be used to dehydrate or dry a gas stream.

The disclosed thermally rearranged polymer blends can also be used for gas separations at elevated temperatures, e.g., at greater than 100° C., greater than 200° C., greater than 300° C., greater than 400° C., or up to 500° C., e.g., from 100° C. to 500° C. The polymer blends can also be used at lower temperatures, e.g., from 0 to 100° C. In specific examples, the polymer blends are contacted with a gas stream at from 0 to 400° C.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. However, those of skill in the art should, in light of the present disclosure, appreciate that many changes can be made in the specific embodiments which are disclosed and still obtain a like or similar result without departing from the spirit and scope of the invention.

Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

CELAZOLE™ 26 dope solution containing 26 wt % PBI solids in DMAc with 1.5 wt % LiCl as a phase stabilizer was purchased from PBI Performance Products. HAB-6FDA-CI was synthesized in house. HAB-6FDA-PA was provided by Air Products. N,N-dimethylacetamide (DMAc), 1-methylimidazole, and lithium chloride were purchased from Sigma Aldrich. Ultra-high purity gases were purchased from Airgas.

Polymer Blend Compositions

Several blend compositions were cast using a solution-casting method described herein. Note that the 1-methylimidazole is believed to evaporate during the film casting process and is likely not present at the same concentration in the film after casting. In general, the blend compositions included 0, 20, 33, 40, 50, 67, 80, and 100 wt % ortho-functionalized polyimide, with the remaining component being CELAZOLE™. For blends including 9 wt % 1-methylimidazole, the weight fractions of polyimide and polybenzimidazole were slightly different, but the mass ratios of ortho-functionalized polyimide to polybenzimidazole remained the same. A list of the blend compositions fabricated is provided below, with the percentages representing the weight fractions of the blended film components prior to casting. Each composition is also given a short identifier.

| NAME | COMPONENTS | | |
|---|---|---|---|
| 20/80 PA/PBI | | 20 wt % HAB-6FDA-PA | 80 wt % CELAZOLE ™ |
| 33/67 PA/PBI | | 33 wt % HAB-6FDA-PA | 67 wt % CELAZOLE ™ |
| 50/50 PA/PBI | | 50 wt % HAB-6FDA-PA | 50 wt % CELAZOLE ™ |
| 20/80 CI/PBI | | 20 wt % HAB-6FDA-CI | 80 wt % CELAZOLE ™ |
| 33/67 CI/PBI | | 33 wt % HAB-6FDA-CI | 67 wt % CELAZOLE ™ |
| 40/60 CI/PBI | | 40 wt % HAB-6FDA-CI | 60 wt % CELAZOLE ™ |
| 50/50 CI/PBI | | 50 wt % HAB-6FDA-CI | 50 wt % CELAZOLE ™ |
| 67/33 CI/PBI | | 67 wt % HAB-6FDA-CI | 33 wt % CELAZOLE ™ |
| 80/20 CI/PBI | | 80 wt % HAB-6FDA-CI | 20 wt % CELAZOLE ™ |
| PBI+1mIm | 9.1 wt % 1-methylimidazole | | 90.9 wt % CELAZOLE ™ |
| CI-1mIm | 9.1 wt % 1-methylimidazole | 90.9 wt % HAB-6FDA-CI | |
| 20/80 PA/PBI+1mIm | 9.1 wt % 1-methylimidazole | 18.2 wt % HAB-6FDA-PA | 72.7 wt % CELAZOLE ™ |
| 33/67 PA/PBI+1mIm | 9.1 wt % 1-methylimidazole | 30 wt % HAB-6FDA-PA | 60.9 wt % CELAZOLE ™ |
| 20/80 CI/PBI+1mIm | 9.1 wt % 1-methylimidazole | 18.2 wt % HAB-6FDA-CI | 72.7 wt % CELAZOLE ™ |
| 33/67 CI/PBI+1mIm | 9.1 wt % 1-methylimidazole | 30 wt % HAB-6FDA-CI | 60.9 wt % CELAZOLE ™ |
| 40/60 CI/PBI+1mIm | 9.1 wt % 1-methylimidazole | 36.4 wt % HAB-6FDA-CI | 54.5 wt % CELAZOLE ™ |
| 50/50 CI/PBI+1mIm | 9.1 wt % 1-methylimidazole | 45.5 wt % HAB-6FDA-CI | 45.5 wt % CELAZOLE ™ |
| 67/33 CI/PBI+1mIm | 9.1 wt % 1-methylimidazole | 60.9 wt % HAB-6FDA-CI | 30 wt % CELAZOLE ™ |
| 80/20 CI/PBI+1mIm | 9.1 wt % 1-methylimidazole | 72.7 wt % HAB-6FDA-CI | 18.2 wt % CELAZOLE ™ |
| 50/50 PA/PBI+LiCl | 9.1 wt % lithium chloride | 45.5 wt % HAB-6FDA-PA | 45.5 wt % CELAZOLE ™ |

Solution Casting of Polymer Films 2.5 wt % solutions of CELAZOLE™, HAB-6FDA-CI, and HAB-6FDA-PA were prepared in N,N-dimethylacetamide (DMAc). Each polymer was weighed and added to a glass scintillation vial, to which a corresponding amount of DMAc was added to form a 2.5 wt % solution. The solutions were stirred at room temperature overnight or until completely dissolved. 2.5 wt % solutions of 1-methylimidazole and lithium chloride in DMAc were likewise prepared.

Solution blending was performed using an adapted procedure from Panapitiya et al. (Gas Separation Membranes Derived from High-Performance Immiscible Polymer Blends Compatibilized with Small Molecules. *ACS Applied Materials & Interfaces* 2015, 7, 18618-18627). For blends without 1-methylimidazole, PBI solution was weighed into a glass scintillation vial. Polyimide solution was added dropwise, then the solution was stirred overnight at room temperature. For blends with 1-methylimidazole, 1-methylimidazole solution was weighed into a glass scintillation vial. A third of the corresponding amount of PBI solution was added, then the mixture was stirred for 30 minutes at room temperature then sonicated for 30 minutes at room temperature using a sonication bath. This cycle was repeated two more times for the remaining two thirds of the PBI solution. Finally, the polyimide solution was added dropwise, and the solution was stirred overnight at room temperature. For blends with lithium chloride, the same procedure was used as described above with lithium chloride solution substituted for 1-methylimidazole solution. For pure (unblended) PBI or polyimide films with 1-methylimidazole additive, 1-methylimidazole solution was weighed into a glass scintillation vial. A third of the corresponding amount of PBI or polyimide solution was added, then the mixture was stirred and sonicated as above. The remaining thirds of the solution were also added in sequence, each followed by 30 minutes of stirring and sonication. The final solutions were stirred overnight at room temperature.

Prior to film casting, the solutions were filtered using a 0.45 m PTFE filter, sonicated for 30 minutes at room temperature, then poured onto a clean glass plate inside a glass ring. The plates were placed in a vacuum oven equipped with a liquid nitrogen trap. The solvent was evaporated by pulling full vacuum on the solution overnight at room temperature, then at 60-80° C. for 4 hours, then at 100° C. for 1 hour (Borjigin et al., Synthesis and characterization of polybenzimidazoles derived from tetraaminodiphenylsulfone for high temperature gas separation membranes. *Polymer* 2015, 71, 135-142). Solid films were delaminated using a razor and deionized (DI) water and boiled in DI water for 4 hours to remove residual DMAc solvent and LiCl present in the PBI dope. Films cast with LiCl compatibilizer were soaked in room temperature DI water for an additional 24 hours to extract residual salt, replacing the water with fresh DI water once. Films were blotted dry, placed between two glass plates coated in aluminum foil, then dried at 150° C. under full vacuum in a vacuum oven for 24 hours.

Blend Morphology

20/80 PA/PBI and 33/67 PA/PBI films cast without 1-methylimidazole appeared visibly homogeneous and were semi-transparent, indicating sub-micron phase separation. 20/80 CI/PBI+1 mIm films cast with 1-methylimidazole had a similar appearance. However, films cast with 33-67 wt % HAB-6FDA-CI and the balance CELAZOLE™ and no 1-methylimidazole showed macroscopic phase separation (FIGS. 1A-1D). All films cast with 1-methylimidazole (18-73 wt % HAB-6FDA-CI, 9.1 wt % 1-methylimdiazole, with the balance CELAZOLE™) were visibly homogeneous without macroscopic phase separation (FIGS. 2A-2D), indicating the addition of 1-methylimidazole was able to compatibilize the polyimide and polybenzimidazole, resulting in better dispersion of the polymers in the blend. A blend of 45.5 wt % HAB-6FDA-PA with 9.1 wt % lithium chloride compatibilizer with the remaining component being CELAZOLE™ was also visibly homogeneous without macroscopic phase separation (FIG. 3), indicating lithium chloride was also able to compatibilize the polyimide and polybenzimidazole.

SEM and TEM were employed to further characterize blend morphology. FIGS. 4A-4D and 5A-5K show cross-sectional SEM images of HAB-6FDA-CI/CELAZOLE™ blends without and with 1-methylimidazole compatibilizer. Compatibilized blends have a matrix/droplet morphology, where the matrix phase is CELAZOLE™ and the dispersed droplets are HAB-6FDA-CI, which was determined by EDS analysis as described in more detail below. Most of the dispersed domains have sub-micron dimensions. It cannot be concluded with certainty that the dispersed domain sizes of the 20/80 wt % HAB-6FDA-CI/CELAZOLE™ blends were reduced when the compatibilizer was added (cf., FIGS. 4A-4B and 5A-5B). However, 33/67 wt % HAB-6FDA-CI/ CELAZOLE™ blends appeared to show smaller, much more uniform dispersion of the polyimide dispersed phase when 1-methylimidazole is added (cf., FIGS. 4C-4D and 5C-5D consistent with the observed differences in optical microscopy (cf., FIGS. 1A and 2A) and with previous reports of the use of 2-methylimidazole to compatibilize 50/50 wt % PBI/6FDA-DAM:DABA(3:2) blends (see Panapitiya et al. Gas Separation Membranes Derived from High-Performance Immiscible Polymer Blends Compatibilized with Small Molecules. *ACS Applied Materials & Interfaces*, 2015, 7, 18618-18627). 400° C. heat treatment of compatibilized blends did not appear to significantly affect their morphology, as they retained a phase separated structure with similar dispersed domain sizes (cf., FIGS. 6A-6K).

The droplet structure of the polyimide phase can be more clearly seen in the TEM image of a 33/67 CI/PBI+1 mIm compatibilized blend without heat treatment in FIG. 7A. The white regions on the left sides of some of the droplets are believed to be the electron beam passing through a narrow region where the polyimide phase has slightly separated from the PBI phase, which possibly occurred during microtoming. Alternatively, there may be some void space created around the polyimide phase during casting.

To confirm that the dispersed phase was in fact polyimide, EDS mapping was performed on a small region of a 33/67 CI/PBI+1 mIm compatibilized blend film. FIGS. 7B-7D are elemental maps for nitrogen, oxygen, and fluorine, respectively, and FIG. 7E is a STEM image of the film region used for mapping. The darker regions in FIG. 7B show that the dispersed phase has lower nitrogen content than the surrounding matrix. Likewise, the brighter regions in FIG. 7C indicate that the dispersed phase has higher oxygen content than the surrounding matrix. Since HAB-6FDA-CI has half the nitrogen atoms per repeat unit as CELAZOLE™ and HAB-6FDA-CI has 8 oxygen atoms per repeat unit while CELAZOLE™ has zero, the dispersed phase must be composed primarily of polyimide, while the matrix phase contains primarily PBI. While a slightly higher fluorine content was observed in the dispersed phase than in the matrix from the polyimide $CF_3$ groups (cf., FIG. 7D), the contrast was poor because few x-ray counts were observed, even after running EDS for around 15 minutes.

Heat Treatment (Thermal Rearrangement) Process

Heat treatment of films samples was performed using a previously described procedure for thermally rearranging polyimides ("TR 400" procedure in Sanders, et al., Gas permeability, diffusivity, and free volume of thermally rearranged polymers based on 3,3'-dihydroxy-4,4'-diamino-biphenyl (HAB) and 2,2'-bis-(3,4-dicarboxyphenyl) hexafluoropropane dianhydride (6FDA). *J Membr Sci,* 2012, 409-410, 232-241). Small sections of films (approximately 4 cm² in area) were cut and placed between two ceramic plates separated by stainless steel washers. The plates were loaded into a Carbolite Split-Tube Furnace equipped with a quartz tube. A nitrogen purge of 900 mL/min at ambient pressure maintained an inert environment around the sample during heat treatment. The samples were heated from ambient temperature to 300° C. at a ramp rate of 5° C./min and held for 1 hour, then heated to 400° C. at a ramp rate of 5° C./min and held for 1 hour. The furnace was then cooled to ambient temperature while under nitrogen flow at a rate not exceeding 10° C./min. After removal from the oven, all of the blend samples with the exception of pure CELAZOLE™ appeared darker in color, particularly those with higher polyimide fractions.

To determine whether the polybenzimidazole/ortho-functional polyimide blends were undergoing a true thermal rearrangement upon heating, thermogravimetric analysis with mass spectrometry (TGA-MS) was employed to observe the difference in thermal mass loss before and after heat treatment at 400° C. under $N_2$. Thermal mass loss and decomposition products were determined using TGA-MS. Measurements were performed using a TA Instruments Q500 TGA connected to a Pfeiffer Vacuum mass spectrometer. 20/80, 33/67, and 40/60 CI/PBI+1 mIm compatibilized blend films were degassed at 50° C. in the TGA for at least 30 minutes prior to ramping to remove sorbed water and oxygen from the system. The TGA temperature ramp was 10° C./min from 50 to 800° C. with UHP $N_2$ purge. The mass spectrometer simultaneously recorded decomposition products using an SEM detector set to continuously scan a 100 amu range with a 100 ms dwell time. The mass loss was normalized to the mass of the samples in the TGA at 150° C. due to water loss from the PBI phase, since PBI is known to strongly sorb water, which requires elevated temperatures to remove (see Moon et al. Water vapor sorption, diffusion, and dilation in polybenzimidazoles. Macromolecules, 2018, 51, 7197-7208).

Acetate-functionalized HAB-6FDA-CI is known to undergo thermal rearrangement between about 300 and 450° C. by first losing acetate groups in the form of ketene as the ortho-position acetate groups convert to ortho-position hydroxyl groups (see Smith et al. Gas sorption and characterization of thermally rearranged polyimides based on 3,3'-dihydroxy-4,4'-diamino-biphenyl (HAB) and 2,2'-bis-(3,4-dicarboxyphenyl) hexafluoropropane dianhydride (6FDA). *Journal of Membrane Science,* 2012, 415-416, 558-567; Sanders et al. Influence of polyimide precursor synthesis route and ortho-position functional group on thermally rearranged (TR) polymer properties: Conversion and free volume. Polymer, 2014, 55, 1636-1647). The hydroxyl-functionalized polyimide then rearranges to a polybenzoxazole structure through loss of $CO_2$. Blends that had not been thermally treated at 400° C. for 1 hour showed a 4-7% mass loss between 250-450° C. that corresponded to the expected rearrangement process. Samples that had already undergone 400° C. heat treatment in the tube furnace, however, showed no mass loss in this region (cf., FIGS. 8A-8C). Analysis of decomposition products via mass spectrometry shows loss of ketene groups (41 amu) and $CO_2$ (44 amu) in this region for the untreated blends (cf., FIGS. 9A-9F), consistent with ortho-functional polyimide conversion to polybenzoxazole. FTIR corroborates the formation of polybenzoxazole in the polyimide phase after heat treatment (cf., FIGS. 10A, 10B, 11A, 11B, 12A, 12B). No mass fragments associated with DMAc (87 amu) or 1-methylimidazole (82 amu) were observed, so both solvent and compatibilizer were likely removed during the film formation process. TGA-MS scans run on films removed from the casting oven after the 100° C. solvent evaporation step and before boiling in water and the subsequent 150° C. drying step also did not show mass fragments associated with 1-methylimidazole despite some DMAc still being present, indicating the 1-methylimidazole is likely removed during the initial solvent removal steps.

Complete removal of the compatibilizer is not necessary for these blends to exhibit good gas transport properties. However, presence of large amounts of unremoved compatibilizer could plasticize the blends, increasing their gas permeabilities at the expense of gas selectivity. Other plasticizers such as LiCl may require other techniques to remove, for example, soaking the films in water or another suitable solvent that would dissolve the compatibilizer but not the polymer blend film.

The conversion of ortho-functional polyimide to polybenzoxazole in the blends can be estimated by determining the difference in mass loss in the 250-450° C. region between the untreated and heat-treated samples. If all of the mass loss between 250 and 450° C. is due to the polyimide phase undergoing thermal rearrangement, the conversion of ortho-functional polyimide to polybenzoxazole can be calculated since the weight fraction of polyimide in the films is known. CELAZOLE™ is thermally stable to above 550° C. (see Chung T.-S. A Critical Review of Polybenzimidazoles. *Journal of Macromolecular Science, Part C,* 1997, 37, 277-301; Kumbharkar et al. High performance polybenzimidazole based asymmetric hollow fibre membranes for $H_2/CO_2$ separation. *Journal of Membrane Science,* 2011, 375, 231-240), so none of the mass loss in the 250-450° C. region is believed to be due to PBI decomposition. Finally, the conversion to polybenzoxazole can be calculated assuming 100% conversion corresponds to 24.3% mass loss of the polyimide (see Sanders et al. Influence of polyimide precursor synthesis route and ortho-position functional group on thermally rearranged (TR) polymer properties: Conversion and free volume. Polymer, 2014, 55, 1636-1647). 20/80, 33/67, and 40/60 CI/PBI+1 mIm compatibilized blend films were estimated to undergo 64%, 58%, and 56% TR conversion of the ortho-functional polyimide, respectively. Since pure HAB-6FDA-CI undergoes 60% conversion at the same heat treatment conditions (see Smith et al. Gas sorption and characterization of thermally rearranged polyimides based on 3,3'-dihydroxy-4,4'-diamino-biphenyl (HAB) and 2,2'-bis-(3,4-dicarboxyphenyl) hexafluoropropane dianhydride (6FDA). *Journal of Membrane Science,* 2012, 415-416, 558-567), the presence of the PBI matrix does not appear to hinder thermal rearrangement of the ortho-functional polyimide.

Gas Transport Sample Preparation

Films of uniform thickness were epoxied to brass support disks using Master Bond EP46HT-2 epoxy with a glass fiber filter backing to protect the film. Film thicknesses were measured using digital calibers (Mitutoyo) and ranged from 10-30 m. The epoxy was cured in air by placing the samples in an oven for 3 hours at 140° C. followed by 3 hours at 180° C. For blends compatibilized with 1-methylimidazole or lithium chloride, samples were loaded into a modified Millipore filter holder equipped with isolation valves on the upstream and downstream. The filter holders were placed in a vacuum oven with both valves open and dried at 150° C. under full vacuum for 24 hours to remove any sorbed water from the samples. The oven was cooled under vacuum and purged with dry air via Drierite columns. The oven was opened and the valves quickly closed to minimize exposure to ambient humidity. The cell was transferred to a temperature-regulated constant-volume, variable-pressure permeation system (Lin, et al., Permeation and Diffusion. In Springer Handbook of Material Measurement Methods, Czichos, H.; Smith, L. E.; Saito, T., Eds. Springer: New York, 2006; pp 371-387), connected, and degassed overnight at 35° C. to remove any sorbed gas from the sample. For blends cast without 1-methylimidazole or lithium chloride, samples were loaded into the filter holder which was already connected to the permeation system. Samples were degassed overnight at 35° C. to remove any sorbed gas from the sample, but did not undergo the additional 150° C. drying step to remove residual sorbed water from the samples.

Polymer blend gas transport properties strongly depend on polymer miscibility and blend morphology. FIG. 13 illustrates theoretical transport properties of CELAZOLE™/HAB-6FDA-CI blends plotted on the 2008 $H_2/CO_2$ upper bound. If the two polymers are miscible, blend permeability would be expected to follow a logarithmic average of the permeabilities of the two components weighted by their volume fractions, leading to a linear trade-off between the two polymers on the upper bound (cf., dashed purple line in FIG. 13). Consequently, miscible blends of two polymers would not surpass the upper bound for a given gas pair unless one of the polymers was already above the upper bound. This represents an intrinsic limitation in polymer materials that requires innovative solutions to overcome.

However, if the two polymers are immiscible, blend permeability is strongly dependent on the morphology of the two phases and can be described by various models. In the simplest case, where one polymer forms uniformly distributed, spherical dispersions in a continuous matrix of the second polymer, the transport behavior can be described by the Maxwell model (see Robeson, L. M. Polymer Blends in Membrane Transport Processes. *Industrial & Engineering Chemistry Research,* 2010, 49, 11859-11865; Petropoulos, J. H. A comparative study of approaches applied to the permeability of binary composite polymeric materials. *Journal of Polymer Science: Polymer Physics Edition,* 1985, 23, 1309-1324; Hopfenberg et al. Transport Phenomena in Polymer Blends. In: D. R. Paul, S. Newman (Eds.) Polymer Blends, Academic Press, Inc., New York, 1978, pp. 445-489). This model predicts the selectivity of the phase separated blend to be primarily dictated by the selectivity of the continuous phase. The dispersed phase would then act either as a more permeable filler, increasing the blend permeability relative to that of the matrix phase polymer (cf., solid red curve in FIG. 13), or as a less permeable filler, decreasing the blend permeability relative to that of the matrix phase polymer (cf., dashed blue curve in FIG. 13).

The permeabilities of $H_2$, $CH_4$, $N_2$, $O_2$, and $CO_2$ were measured at 35° C., at pressures between 2 and 10 atm, and values reported herein are at 10 atm. The permeate pressure rise was measured with an MKS Baratron with a 10 Torr range, and the feed pressure was measured with a Honeywell STJE transducer. $N_2$ and $CH_4$ was not tested for some membranes due to their low flux approaching the sensitivity of the instrument.

The gas transport properties of non-heat treated CELAZOLE™/HAB-6FDA-CI blends compatibilized with 1-methylimidazole that underwent drying at 150° C. are shown in FIGS. 14A and 14B. The permeabilities and selectivities of 20/80 and 33/67 CI/PBI+1 mIm compatibilized blends were very similar to those of pure CELAZOLE™ cast with 1-methylimidazole. These results are consistent with the blends having PBI as the continuous phase. A discontinuity in permeability and selectivity occurred at compositions between 33 and 67 wt % HAB-6FDA-CI, indicating phase inversion may occur at some intermediate composition where the polymer in the continuous phase changes from PBI to polyimide. The permeabilities of 67/33 and 80/20 CI/PBI+1 mIm compatibilized blends were somewhat lower than pure HAB-6FDA-CI with 1-methylimidazole, which was expected since the PBI dispersed phase is acting as a low permeability filler.

After heat treatment at 400° C., the $H_2$ permeability of CELAZOLE™ cast with 1-methylimidazole was relatively unchanged (3.4 Barrer vs. 3.7 Barrer), but the $O_2$ and $CO_2$ permeabilities were lower, resulting in an increase in $H_2/CO_2$ selectivity from 17 to 31 (cf., FIGS. 15A and 15B). A similar increase in selectivity for pure CELAZOLE™ without 1-methylimidazole was previously observed by Perez et al. (Improvement of gas separation properties of polybenzimidazole membranes for gas separations at high pressure and high temperature through thermal treatment. *Prepr. Pap.-Am. Chem. Soc., Div. Energy Fuels,* 2016, 61, 208) for pure CELAZOLE™ dried at 300° C. under vacuum for one day which had a $H_2/CO_2$ selectivity of 49 at 5 bar and 35° C. This was much higher than the $H_2/CO_2$ selectivity of 18 measured at 5 bar and 35° C. for CELAZOLE™ dried at 250° C. This previous study only looked at the effect of heat treatment on pure PBI, not blends incorporating PBI which can have significantly different properties as observed below.

The permeabilities of HAB-6FDA-CI cast with 1-methylimidazole increased by over an order of magnitude after heat treatment, presumably due to the TR reaction, and selectivities were reduced (cf., FIGS. 15A and 15B). This behavior is consistent with previously observed permeability increases for TR polymers. 67/33 and 80/20 CI/PBI+1 mIm compatibilized blends showed a significant increase in permeability (cf., FIGS. 15A and 15B), indicating thermal rearrangement of the continuous polyimide phase contributed strongly to the permeability increase of blends at these compositions.

After heat treatment, the 20/80 CI/PBI+1 mIm thermally rearranged polymer blend with compatibilizer showed a slight decrease in $H_2$ permeability and a 40% and 61% decrease in $O_2$ and $CO_2$ permeabilities relative to its properties before heat treatment, respectively (FIGS. 15A and 15B). This resulted in a high $H_2/CO_2$ selectivity of 42, which surpassed the 2008 upper bound (FIG. 16) and exceeded previously measured selectivities for pure CELAZOLE™ by 51%. The 33/67 CI/PBI+1 mIm thermally rearranged polymer blend with compatibilizer showed a 32% increase in $H_2$ permeability after heat treatment but a 28% decrease in $CO_2$ permeability, resulting in a $H_2/CO_2$ selectivity of 29 that also surpassed the upper bound. This composition exhibited over twice the $H_2$ permeability of CELAZOLE™ while maintaining essentially the same $H_2/CO_2$ selectivity. This simultaneous increase in permeability and selectivity for the 33/67 CI/PBI+1 mIm compatibilized blend is unusual, as most membrane treatments result in an increase in one at the expense of the other.

The 20/80 CI/PBI thermally rearranged polymer blend without compatibilizer or the additional 150° C. drying step showed a $H_2$ permeability of 5.2 Barrer and $H_2/CO_2$ selectivity of 21. Thermally rearranged polymer blends comprised of 20 or 33 wt % HAB-6FDA-PA with the balance CELAZOLE™ that were cast without compatibilizer and did not undergo the additional 150° C. drying step showed $H_2$ permeabilities of 4.7 Barrer and 6.2 Barrer, respectively, and $H_2/CO_2$ selectivities of 38 and 28, respectively. 20/80, 33/67, and 40/60 CI/PBI+1 mIm thermally rearranged compatibilized blends that did not undergo the additional 150° C. drying step generally showed higher gas permeabilities and lower $H_2/CO_2$ selectivities compared to the same compositions that underwent the 150° C. drying step (e.g., $H_2$ permeabilities of 6.9, 8.9, and 10.2 Barrer and $H_2/CO_2$ selectivities of 18, 25, and 16 for 20/80, 33/67, and 40/60 33/67 CI/PBI+1 mIm thermally rearranged films without 150° C. drying, respectively).

The blend comprised of 45.5 wt % HAB-6FDA-PA and 45.5 wt % CELAZOLE™ with 9.1 wt % lithium chloride compatibilizer showed a $H_2$ permeability of 6.7 Barrer and $H_2/CO_2$ selectivity of 11 without heat treatment. The $H_2/CH_4$ selectivity was 890 and $O_2/N_2$ selectivity was 9.8 with an $O_2$ permeability of 0.19 Barrer. The high selectivities observed for this blend indicate the two polymer components are effectively compatibilized by the lithium chloride, as a macroscopically phase separated blend would show much lower selectivities due to preferential transport through HAB-6FDA-PA regions based on a parallel-resistance transport model.

X-Ray Scattering

While not wishing to be bound by theory, there are several hypotheses about why the thermally rearranged 20/80 and 33/67 CI/PBI+1 mIm compatibilized blends showed higher selectivities after heat treatment than their untreated analogs. One possibility is thermal crosslinking is occurring within the polymer matrix, which is known to increase selectivities and decrease permeabilities. Ortho-functionalized polyimides are known to be insoluble after thermal rearrangement, possibly due to crosslinking (Sanders, et al., Gas permeability, diffusivity, and free volume of thermally rearranged polymers based on 3,3'-dihydroxy-4,4'-diamino-biphenyl (HAB) and 2,2'-bis-(3,4-dicarboxyphenyl) hexafluoropropane dianhydride (6FDA). *J Membr Sci* 2012, 409-410, 232-241), and it is possible that PBI may be able to participate in this reaction as well.

Another possibility is that heat treatment may cause tighter chain packing in the PBI phase from densification, which would lead to a decrease in free volume and an enhancement in the size-sieving ability of the continuous PBI phase. Fractional free volume (FFV) represents the amount of unoccupied space between polymer chains available for gas diffusion, and polymers with higher FFV typically exhibit much higher gas permeabilities. FFVs for CELAZOLE™ cast with 1-methylimidazole with and without heat treatment were estimated from density measurements and group contribution parameters. 400° C. heat treatment caused a drop in FFV for CELAZOLE™ from 0.125±0.001 to 0.103±0.001, which was due to an increase in density from 1.262±0.007 g/cm³ to 1.295±0.008 g/cm³.

When treated at temperatures around 350° C., CELAZOLE™ exhibits an increase in structural order evidenced by x-ray scattering (see Aili et al. Thermal curing of PBI membranes for high temperature PEM fuel cells. *Journal of Materials Chemistry*, 2012, 22, 5444-5453). This increase in structural order has also been observed by FTIR to occur at temperatures at and above 400° C., and an N—H stretching mode at 3420 cm$^{-1}$ has been attributed to these para-crystalline domains (see Musto et al. Infrared spectroscopy of polybenzimidazole in the dry and hydrate forms: a combined experimental and computational study. *ACS Omega*, 2018, 3, 11592-11607). Since CELAZOLE™ is only moderately soluble in DMAc, an increase in structural ordering or "para-crystallinity" may result in insoluble and low permeability regions.

Both small angle x-ray scattering (SAXS) and wide angle x-ray scattering (WAXS) were measured for untreated and heat treated samples of CELAZOLE™ and HAB-6FDA-CI films cast with 1-methylimidazole and 20/80 and 33/67 CI/PBI+1 mIm compatibilized blends. Scattering intensities were normalized for film thickness to permit quantitative comparisons between samples. SAXS results are shown in FIGS. 17A-17D. While no peaks were present in untreated films, consistent with their amorphous behavior, a peak emerged at around 0.290 for CELAZOLE™ and 0.38-0.42° for the 20/80 and 33/67 CI/PBI+1 mIm compatibilized blends. Although the SAXS peaks for heat treated CELAZOLE™ and polyimide/PBI blends are less intense and less sharp than those observed in semicrystalline polymers like polyethylene, this pattern nonetheless suggests the formation of some para-crystalline regions in CELAZOLE™ and in the PBI phase of the blends. No peak emerged in HAB-6FDA-CI after heat treatment, indicating the ortho-functional polyimide does not undergo the same structural ordering as PBI.

WAXS results for the same samples are shown in FIGS. 18A-18D. The d-spacing has often been ascribed to intermolecular distance between polymer chains. Before heat treatment, a broad peak in CELAZOLE™ cast with 1-methylimidazole was previously observed at a d-spacing of 4.7 Å (see Musto et al. Infrared spectroscopy of polybenzimidazole in the dry and hydrate forms: a combined experimental and computational study. *ACS Omega*, 2018, 3, 11592-11607). After heat treatment, this peak became much sharper, which was previously observed by Aili et al. (Thermal curing of PBI membranes for high temperature PEM fuel cells. *Journal of Materials Chemistry*, 2012, 22, 5444-5453) for PBI treated for at least 10 minutes at 350° C. under argon. This peak was centered around 19°, which is very close to the 2θ value of 18 reported previously. Additionally, the absolute scattering intensity decreased at lower angles (i.e., higher d-spacings), which may indicate a narrowing of free volume distribution toward smaller free volume elements that would correspond with lower d-spacing. This result is also consistent with the observed reduction in FFV and increase in density for CELAZOLE™ after heat treatment.

Gel Fraction

Samples of thermally rearranged 20/80 and 33/67 CI/PBI+1 mIm compatibilized blends were dried at 150° C. under full vacuum for 24 hours then removed and weighed in sealed glass vials. Samples were then placed in a Soxhlet extraction column with DMAc under reflux for 24 hours. The samples were removed from the Soxhlet extractor and dried under full vacuum at 150° C. overnight to remove DMAc solvent. The samples and extraction cylinders were removed and equilibrated with ambient air, then weighed. The initial weight of the extraction cylinder was subtracted. The gel fraction (i.e., insoluble fraction) was calculated as the final film mass divided by the initial film mass.

The gel fractions of thermally rearranged 20/80 and 33/67 CI/PBI+1 mIm compatibilized blends were determined to be approximately 64 and 62% after heat treatment. Thus, high temperature treatment induced some degree of insolubility in the blends. TR polymers are typically insoluble and may form a crosslinked structure in the dispersed phase following heat treatment (see Sanders et al. Gas permeability, diffusivity, and free volume of thermally rearranged polymers based on 3,3'-dihydroxy-4,4'-diamino-biphenyl (HAB) and 2,2'-bis-(3,4-dicarboxyphenyl) hexafluoropropane dianhydride (6FDA). *Journal of Membrane Science*, 2012, 409-410, 232-241). However, since the insoluble portion of the heat-treated blends is 2-3 times greater than the amount of TR polymer present, crosslinking in the dispersed ortho-functional polyimide phase cannot fully explain the decreased solubility and increased gas selectivity. It is likely there are some insoluble regions forming the PBI phase.

Summary of Findings

While not wishing to be bound by theory, the similar changes in the WAXS spectra for CELAZOLE™ and the 20/80 CI/PBI+1 mIm compatibilized blend following heat treatment are consistent with the transport behavior of this blend composition being influenced by densification and ordering of the PBI phase. A reduction in free volume and a potential narrowing of the free volume distribution in the PBI phase from high temperature annealing reduced permeabilities of larger gases such as $O_2$ and $CO_2$ in the PBI matrix phase with less effect on smaller gases such as $H_2$. This behavior increased gas selectivities of the PBI matrix phase which, in turn, increased blend selectivity. As there was relatively little polyimide in this composition, the thermal rearrangement of the ortho-functional polyimide contributed little to the gas transport properties of the blend at this particular composition. Consequently, the gas permeabilities of CELAZOLE™ and the 20/80 CI/PBI+1 mIm compatibilized blend were similar after heat treatment. On the other hand, the 33/67 CI/PBI+1 mIm compatibilized blend exhibited higher gas permeabilities before and after heat treatment than CELAZOLE™ treated under the same conditions. The simultaneous increase in permeability and selectivity after heat treatment of the 33/67 CI/PBI+1 mIm compatibilized blend occurred from the combination of increased permeability in the dispersed ortho-functional polyimide phase from the TR reaction and increased selectivity in the PBI matrix phase from ordering and densification.

The phase separated nature of the thermally rearranged PBI/ortho-functional polyimide blends is advantageous to allow the thermal rearrangement reaction in the ortho-functional polyimide to occur independently of the PBI, which allows the desirable gas transport properties of each phase to be preserved. The TR reaction in the ortho-functional polyimide phase increases gas permeabilities in that phase and can increase the permeabilities of a PBI/ortho-functional polyimide blend of appropriate composition and morphology. Heat treatment can also cause densification of the continuous PBI matrix phase which can be advantageous to increase the gas selectivities of the blend. However, this behavior is not necessarily limited to these specific examples, as there may be other methods to form desirable morphologies for these blends, for example, forming copolymers involving one or more PBI or ortho-functional polyimide or using different chemicals as compatibilizers or solvents. Variations on the chemical structure of PBI and/or ortho-functional polyimide could further improve the properties of the blend, for example, replacing the acetate ortho-functional group on HAB-6FDA-CI with a larger functional group such as isobutyrate to further increase gas permeabilities or incorporating a sulfone group into the chemical structure of PBI to enhance solution processability. Heat treatment at other temperatures and conditions than those described herein may also be found to yield better combinations of permeability and selectivity.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A polymer blend, comprising: a thermally rearranged ortho-functionalized polyimide homo or copolymer and a polybenzimidazole homo or copolymer, wherein the thermally rearranged polyimide homo or copolymer is a polymer comprising a phenylene heterocyclic group, wherein the polymer blend is an immiscible blend comprising a dispersed phase and a continuous phase.

2. The polymer blend of claim 1, wherein the thermally rearranged polyimide homo or copolymer comprises a polybenzoxazole, polybenzothiazole, and/or polybenzimidazole.

3. The polymer blend of claim 1, wherein the continuous phase comprises the polybenzimidazole homo or copolymer and the dispersed phase comprises the thermally rearranged polyimide homo or copolymer.

4. The polymer blend of claim 1, wherein the continuous phase comprises the thermally rearranged polyimide homo or copolymer and the dispersed phase comprises the polybenzimidazole homo or copolymer.

5. The polymer blend of claim 1, wherein the polybenzimidazole homo or copolymer has a domain represented by Formula I

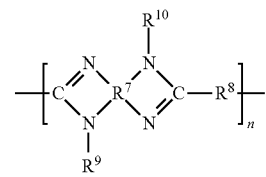

wherein n is from 2 to 100,000;

$R^7$ is or is a moiety that comprises

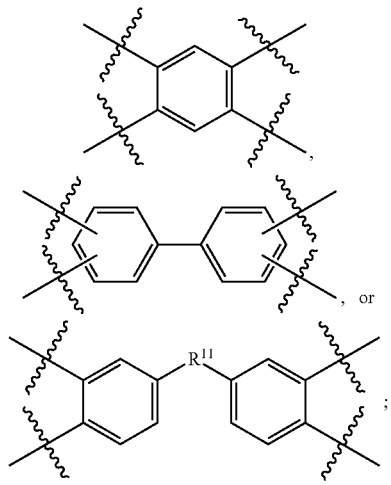

$R^8$ is or is a moiety that comprises —$(CH_2)_{1-8}$—,

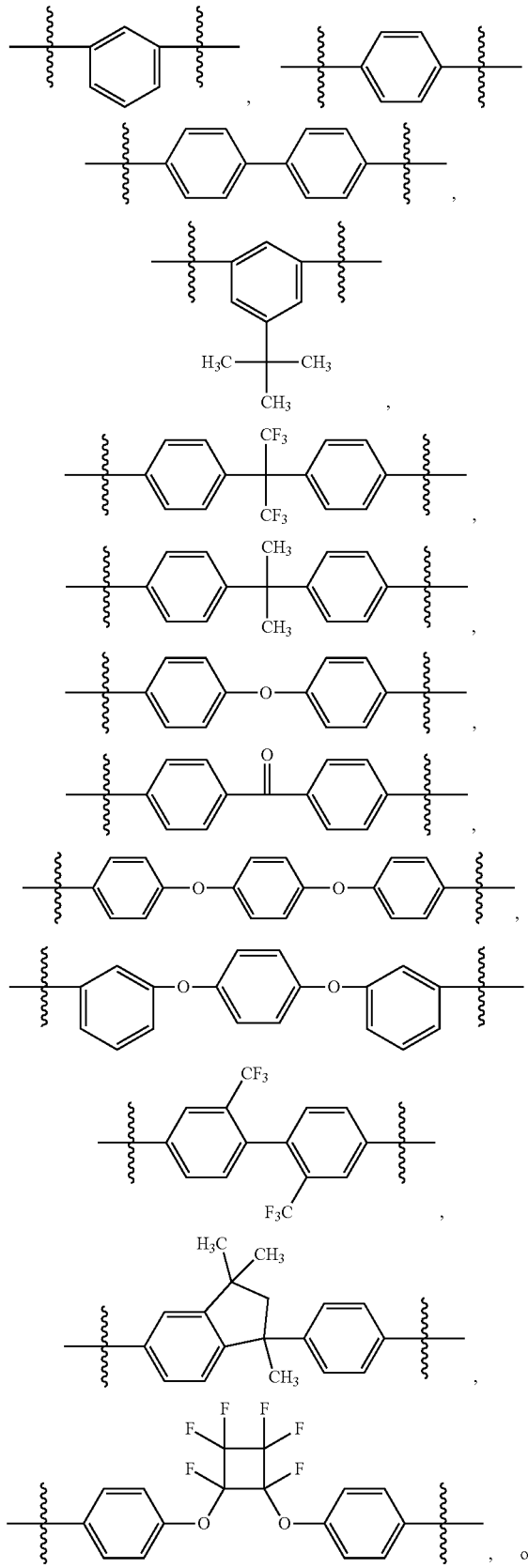

, or

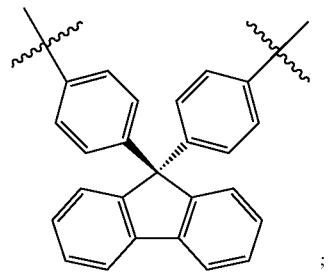

;

$R_9$ and $R_{10}$ are independently chosen from H, $C_1$-$C_3$ alkyl, —$CH_2Si(CH_3)_3$, or

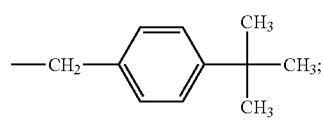

and $R^{11}$ is —O—, $S(O)_2$—, or

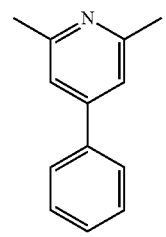

.

6. The polymer blend of claim 1, wherein the wherein the polybenzimidazole has the formula

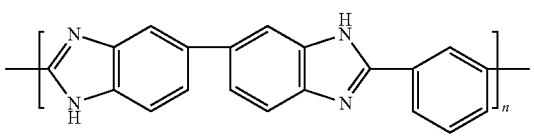

wherein n is an integer from 2 to 100,000.

7. The polymer blend of claim 1, wherein the thermally rearranged ortho-functionalized polyimide homo or copolymer has a domain before thermal rearrangement represented by Formula II

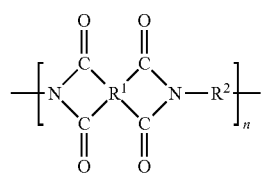

II wherein
n is from 2 to 100,000;
R¹ is or is a moiety that comprises

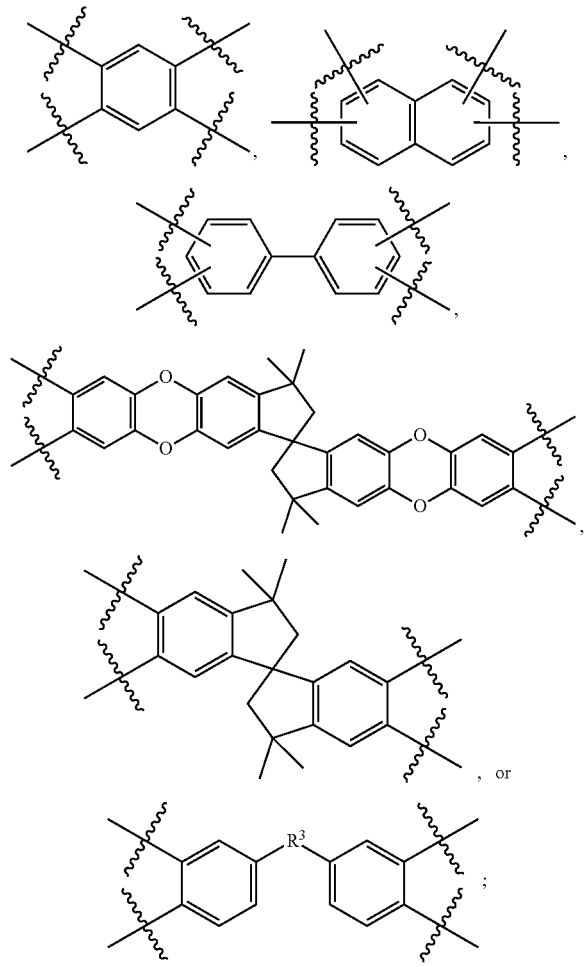

R² is or is a moiety that comprises

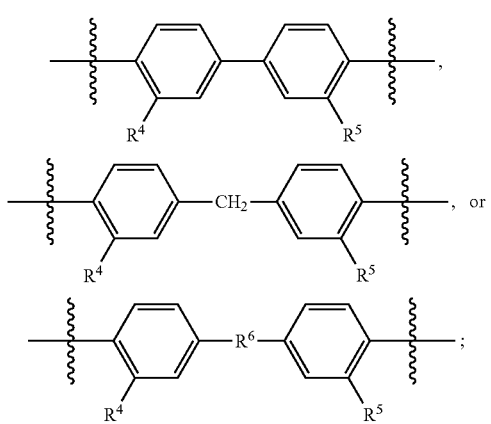

R³ is chosen from —O—, —S—, —C(O)—, —S(O)—, —S(O)₂—, —CH₂—, —C(CH₃)₂—, —C(CF₃)₂—,

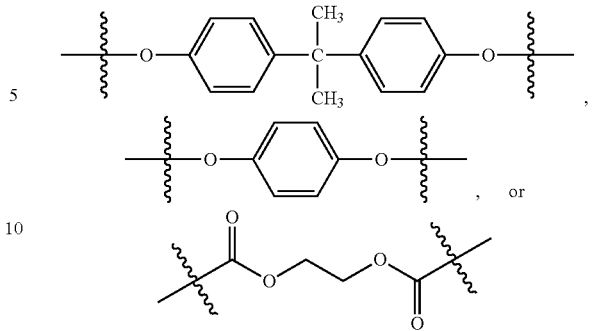

R⁴ and R⁵ are each independently chosen from —OH, —SH, —OC(O)C₁-C₆ alkyl, —OC(O)C₁-C₆ haloalkyl, —OC(O) C₁-C₆ cycloalkyl, or NH₂; and R⁶ is chosen from —O—, —S—, —C(O)—, —S(O)—, —S(O)₂—, —CH₂—, —C(CH₃)₂—, or —C(CF₃)₂—.

8. The polymer blend of claim 7, wherein R⁴ and R⁵ are each independently chosen from

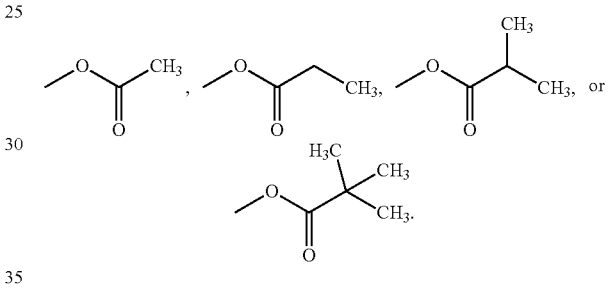

9. The polymer blend of claim 1, wherein the thermally rearranged ortho-functionalized polyimide homo or copolymer has, before thermal rearrangement, a formula

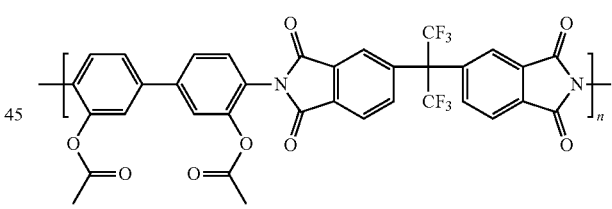

wherein n is an integer from 2 to 100,000.

10. The polymer blend of claim 1, wherein the thermally rearranged ortho-functionalized polyimide homo or copolymer has, before thermal rearrangement, a formula

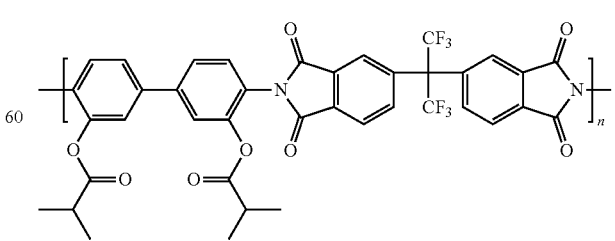

wherein n is an integer from 2 to 100,000.

11. The polymer blend of claim 1, wherein the thermally rearranged ortho-functionalized polyimide homo or copolymer has, before thermal rearrangement, a formula

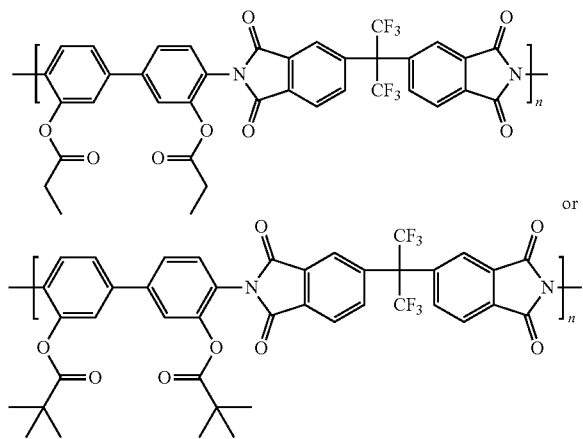

wherein n is an integer from 2 to 100,000.

12. The polymer blend of claim 1, wherein the thermally rearranged ortho-functionalized polyimide homo or copolymer has, before thermal rearrangement, a formula

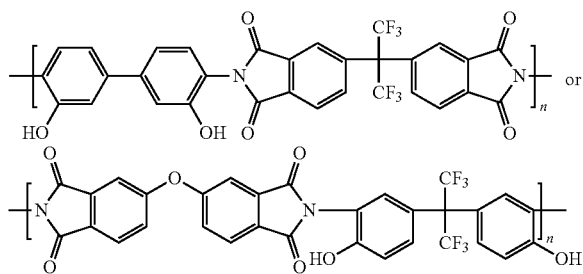

wherein n is an integer from 2 to 100,000.

13. The polymer blend of claim 1, wherein the thermally rearranged ortho-functionalized polyimide homo or copolymer is present in the blend at from 1 wt % to 99 wt %.

14. The polymer blend of claim 1, wherein the polybenzimidazole homo or copolymer is present in the blend at from 1 wt % to 99 wt %.

15. The polymer blend of claim 1, wherein the thermally rearranged ortho-functionalized polyimide homo or copolymer is present in the blend at from 5 wt % to 45 wt %, and the polybenzimidazole homo or copolymer is present in the blend at from 95 wt % to 55 wt %.

16. The polymer blend of claim 1, further comprising an organic compatibilizer having Formula III

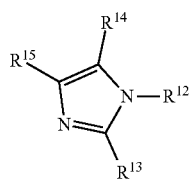

III wherein $R^{12}$, $R^{13}$, $R^{14}$, and $R^{15}$ are independently chosen from $C_1$-$C_6$ alkyl, aryl, or arylalkyl.

17. The polymer blend of claim 1, further comprising an organic compatibilizer chosen from 1-methylimidazole, 2-methylimidazole, 1-ethylimidazole, 2-ethylimidazole, 1-propylimidazole, 2-propylimidazole, 1-butylimidazole, 2-butylimidazole, 1-phenylimidazole, 2-phenylimidazole, 1-benzylimidazole, or 2-benzylimidazole.

18. The polymer blend of claim 1, further comprising an organic compatibilizer chosen from pyrrolines, pyrroles, pyrazolidines, imidazolidines, pyrazolines, pyrazoles, imidazolines, triazoles, tetrazoles, furans, dioxolanes, thiophenes, oxazoles, isoxazoles, isothiazoles, thiazoles, oxathiolanes, oxadiazoles, thiadiazoles, pyridines, piperazines, pyridazines, pyrimidines, pyrazines, triazines, pyrans, pyryliums, dioxanes, dioxines, thiopyrans, dithianes, trithianes, morpholines, oxazines, thiomorpholines, thiazines, indoles, isoindoles, indolizines, indazoles, benzimidazoles, azaindoles, azaindazoles, purines, benzofurans, isobenzofurans, benzothiophenes, benzoisoxazoles, benzoisothiazoles, benxoxazoles, benzothiazoles, benzothiadiazoles, adenines, guanines, hydroquinolines, quinolones, isoquinolines, quinolizines, quinoxalines, phthalazines, quinazolines, cinnolines, naphthyridines, pyridopyrimidines, pyridopyrazines, pteridines, chromenes, isochromenes, chromenones, benzoxazines, quinolinones, isoquinolinones, carbazoles, dibenzofurans, acridines, phenazines, phenoxazines, phenothiazines, phenoxathiines, azepines, diazepines, dihydroazepines, thiepines, thiazepines, azocines, azecines, or imidazolium-based ionic liquids.

19. The polymer blend of claim 1, further comprising an inorganic compatibilizer.

20. The polymer blend of claim 19, wherein the inorganic compatibilizer is chosen from lithium chloride, lithium bromide, sodium chloride, sodium bromide, potassium chloride, potassium bromide, calcium chloride, calcium bromide, copper chloride, a metal organic framework, or a zeolitic imidazolate framework.

21. The polymer blend of claim 16, wherein the compatibilizer is present at from 0.5 to 99 wt % of the blend.

22. A method of forming a polymer blend, comprising: dissolving an ortho-functionalized polyimide homo or copolymer and a polybenzimidazole homo or copolymer in a solvent to form a polymer solution; contacting a support with the polymer solution; and evaporating the solvent to provide a thin layer comprising the polymer blend on the support, and wherein the formed polymer blend is an immiscible blend comprising a dispersed phase and a continuous phase.

23. A method of separating a target gas from a gas stream, comprising: contacting the polymer blend of claim 1 with the gas stream, such that the target gas selectively permeates the polymer blend, thereby being separated the gas stream.

24. A method of dehydrating a gas stream, comprising contacting the polymer blend of claim 1 with the gas stream, such that water permeates the polymer blend, thereby being separated from the gas stream.

* * * * *

UNITED STATES PATENT AND TRADEMARK OFFICE
CERTIFICATE OF CORRECTION

| | | |
|---|---|---|
| PATENT NO. | : 11,613,649 B2 | |
| APPLICATION NO. | : 17/044540 | |
| DATED | : March 28, 2023 | |
| INVENTOR(S) | : Benny D. Freeman et al. | |

It is certified that error appears in the above-identified patent and that said Letters Patent is hereby corrected as shown below:

In the Claims

In Column 40, Lines 41-42 of Claim 6, the text "…of claim 1, wherein the wherein the polybenzimidazole…" should read --of claim 1, wherein the polybenzimidazole--

Signed and Sealed this
Twenty-seventh Day of June, 2023

Katherine Kelly Vidal
*Director of the United States Patent and Trademark Office*